US012437491B2

(12) United States Patent
Spong

(10) Patent No.: US 12,437,491 B2
(45) Date of Patent: Oct. 7, 2025

(54) SCALING A 3D VOLUME IN EXTENDED REALITY

(71) Applicant: Snap Inc., Santa Monica, CA (US)

(72) Inventor: Mason Spong, Provo, UT (US)

(73) Assignee: Snap Inc., Santa Monica, CA (US)

(*) Notice: Subject to any disclaimer, the term of this patent is extended or adjusted under 35 U.S.C. 154(b) by 182 days.

(21) Appl. No.: 18/065,201

(22) Filed: Dec. 13, 2022

(65) Prior Publication Data
US 2024/0193882 A1 Jun. 13, 2024

(51) Int. Cl.
G06T 19/20 (2011.01)
G06F 3/01 (2006.01)
G06T 19/00 (2011.01)

(52) U.S. Cl.
CPC .............. *G06T 19/20* (2013.01); *G06F 3/014* (2013.01); *G06F 3/017* (2013.01); *G06T 19/006* (2013.01); *G06T 2219/2016* (2013.01)

(58) Field of Classification Search
CPC .................. G06T 19/20; G06T 19/006; G06T 2219/2016; G06F 3/014; G06F 3/017
See application file for complete search history.

(56) References Cited

U.S. PATENT DOCUMENTS

| | | | |
|---|---|---|---|
| 7,971,156 B2 | 6/2011 | Albertson et al. |
| 7,996,793 B2 | 8/2011 | Latta et al. |
| 8,487,938 B2 | 7/2013 | Latta et al. |
| 8,856,691 B2 | 10/2014 | Geisner et al. |
| 9,225,897 B1 | 12/2015 | Sehn et al. |
| 9,230,160 B1 | 1/2016 | Kanter |
| 9,276,886 B1 | 3/2016 | Samaranayake |
| 9,705,831 B2 | 7/2017 | Spiegel |
| 9,742,713 B2 | 8/2017 | Spiegel et al. |
| 10,102,423 B2 | 10/2018 | Shaburov et al. |
| 10,284,508 B1 | 5/2019 | Allen et al. |
| 10,439,972 B1 | 10/2019 | Spiegel et al. |
| 10,509,466 B1 | 12/2019 | Miller et al. |

(Continued)

FOREIGN PATENT DOCUMENTS

| | | |
|---|---|---|
| CN | 103049761 | 8/2016 |
| EP | 3707693 | 9/2020 |

(Continued)

OTHER PUBLICATIONS

U.S. Appl. No. 18/320,059, filed May 18, 2023, Rotating a 3D Volume in Extended Reality.

(Continued)

*Primary Examiner* — Kent W Chang
*Assistant Examiner* — Karl Duc Truong
(74) *Attorney, Agent, or Firm* — Schwegman Lundberg & Woessner, P.A.

(57) ABSTRACT

An extended Reality (XR) system provides methodologies for scaling a virtual object in an XR user interface of the XR system. The methodologies include providing to a user an XR user interface of an XR system, where the XR user interface includes a virtual object displayed to the user. The XR system determines a pinch location of a pinch hand pose being made by the user and scales the virtual object based on the pinch location and a virtual object center point of the virtual object. The XR system redisplays the scaled virtual object to the user in the XR user interface.

20 Claims, 13 Drawing Sheets

(56) References Cited

U.S. PATENT DOCUMENTS

| | | | |
|---|---|---|---|
| 10,514,876 B2 | 12/2019 | Sehn | |
| 10,579,869 B1 | 3/2020 | Xiong et al. | |
| 10,591,730 B2 | 3/2020 | Rodriguez, II et al. | |
| 10,614,855 B2 | 4/2020 | Huang | |
| 10,748,347 B1 | 8/2020 | Li et al. | |
| 10,958,608 B1 | 3/2021 | Allen et al. | |
| 10,962,809 B1 | 3/2021 | Castañeda | |
| 10,996,846 B2 | 5/2021 | Robertson et al. | |
| 10,997,787 B2 | 5/2021 | Ge et al. | |
| 11,012,390 B1 | 5/2021 | Al Majid et al. | |
| 11,030,454 B1 | 6/2021 | Xiong et al. | |
| 11,036,368 B1 | 6/2021 | Al Majid et al. | |
| 11,062,498 B1 | 7/2021 | Voss et al. | |
| 11,087,728 B1 | 8/2021 | Canberk et al. | |
| 11,092,998 B1 | 8/2021 | Castañeda et al. | |
| 11,106,342 B1 | 8/2021 | Al Majid et al. | |
| 11,126,206 B2 | 9/2021 | Meisenholder et al. | |
| 11,143,867 B2 | 10/2021 | Rodriguez, II | |
| 11,169,600 B1 | 11/2021 | Canberk et al. | |
| 11,227,626 B1 | 1/2022 | Krishnan Gorumkonda et al. | |
| 11,307,747 B2 | 4/2022 | Dancie et al. | |
| 11,531,402 B1 | 12/2022 | Stolzenberg | |
| 11,546,505 B2 | 1/2023 | Canberk | |
| 2009/0012788 A1 | 1/2009 | Gilbert et al. | |
| 2011/0301934 A1 | 12/2011 | Tardif | |
| 2014/0171036 A1 | 6/2014 | Simmons | |
| 2015/0120293 A1 | 4/2015 | Wohlert et al. | |
| 2015/0370320 A1 | 12/2015 | Connor | |
| 2016/0239080 A1* | 8/2016 | Marcolina | G06T 17/10 |
| 2017/0123487 A1 | 5/2017 | Hazra et al. | |
| 2017/0277684 A1 | 9/2017 | Dharmarajan Mary | |
| 2017/0277685 A1 | 9/2017 | Takumi | |
| 2017/0351910 A1 | 12/2017 | Elwazer et al. | |
| 2018/0158370 A1 | 6/2018 | Pryor | |
| 2019/0042957 A1* | 2/2019 | Holz | G06F 3/017 |
| 2019/0146219 A1 | 5/2019 | Rodriguez, II | |
| 2019/0362562 A1 | 11/2019 | Benson | |
| 2021/0011612 A1 | 1/2021 | Dancie et al. | |
| 2021/0074016 A1 | 3/2021 | Li et al. | |
| 2021/0090337 A1* | 3/2021 | Ravasz | G06T 19/006 |
| 2021/0166732 A1 | 6/2021 | Shaburova et al. | |
| 2021/0174034 A1 | 6/2021 | Retek et al. | |
| 2021/0241529 A1 | 8/2021 | Cowburn et al. | |
| 2021/0263593 A1 | 8/2021 | Lacey | |
| 2021/0303075 A1 | 9/2021 | Cowburn et al. | |
| 2021/0303077 A1 | 9/2021 | Anvaripour et al. | |
| 2021/0303140 A1 | 9/2021 | Mourkogiannis | |
| 2021/0382564 A1 | 12/2021 | Blachly et al. | |
| 2021/0397000 A1 | 12/2021 | Rodriguez, II | |
| 2021/0405761 A1 | 12/2021 | Canberk | |
| 2022/0103748 A1 | 3/2022 | Canberk | |
| 2022/0188539 A1 | 6/2022 | Chan et al. | |
| 2022/0206588 A1 | 6/2022 | Canberk et al. | |
| 2022/0291753 A1 | 9/2022 | Erivantcev et al. | |
| 2022/0300730 A1 | 9/2022 | Eirinberg et al. | |
| 2022/0300731 A1 | 9/2022 | Eirinberg et al. | |
| 2022/0326781 A1 | 10/2022 | Hwang et al. | |
| 2022/0334649 A1 | 10/2022 | Hwang et al. | |
| 2022/0375174 A1 | 11/2022 | Arya et al. | |
| 2023/0038709 A1 | 2/2023 | Ramani et al. | |
| 2023/0195236 A1 | 6/2023 | Sun | |
| 2024/0152245 A1* | 5/2024 | Broughton | G06F 3/013 |
| 2024/0385690 A1 | 11/2024 | Spong | |

FOREIGN PATENT DOCUMENTS

| | | |
|---|---|---|
| EP | 4172726 | 5/2023 |
| EP | 4172730 | 5/2023 |
| KR | 20220158824 | 12/2022 |
| WO | 2016168591 | 10/2016 |
| WO | 2019094618 | 5/2019 |
| WO | 2022005687 | 1/2022 |
| WO | 2022005693 | 1/2022 |
| WO | 2022066578 | 3/2022 |
| WO | 2022060549 | 4/2022 |
| WO | 2022132381 | 6/2022 |
| WO | 2022146678 | 7/2022 |
| WO | 2022198182 | 9/2022 |
| WO | 2022216784 | 10/2022 |
| WO | 2022225761 | 10/2022 |
| WO | 2022245765 | 11/2022 |
| WO | WO-2024129589 A1 | 6/2024 |

OTHER PUBLICATIONS

"U.S. Appl. No. 18/320,059, Examiner Interview Summary mailed Apr. 11, 2025", 2 pgs.

"U.S. Appl. No. 18/320,059, Non Final Office Action mailed Jan. 23, 2025", 13 pgs.

"U.S. Appl. No. 18/320,059, Response filed Apr. 23, 2025 to Non Final Office Action mailed Jan. 23, 2025", 11 pgs.

"U.S. Appl. No. 18/320,059, Notice of Allowance mailed May 7, 2025", 5 pgs.

"U.S. Appl. No. 18/320,059, Corrected Notice of Allowability mailed May 19, 2025", 2 pgs.

"International Application Serial No. PCT US2023 083368, International Search Report mailed Mar. 6, 2024", 3 pgs.

"International Application Serial No. PCT US2023 083368, Written Opinion mailed Mar. 6, 2024", 7 pgs.

\* cited by examiner

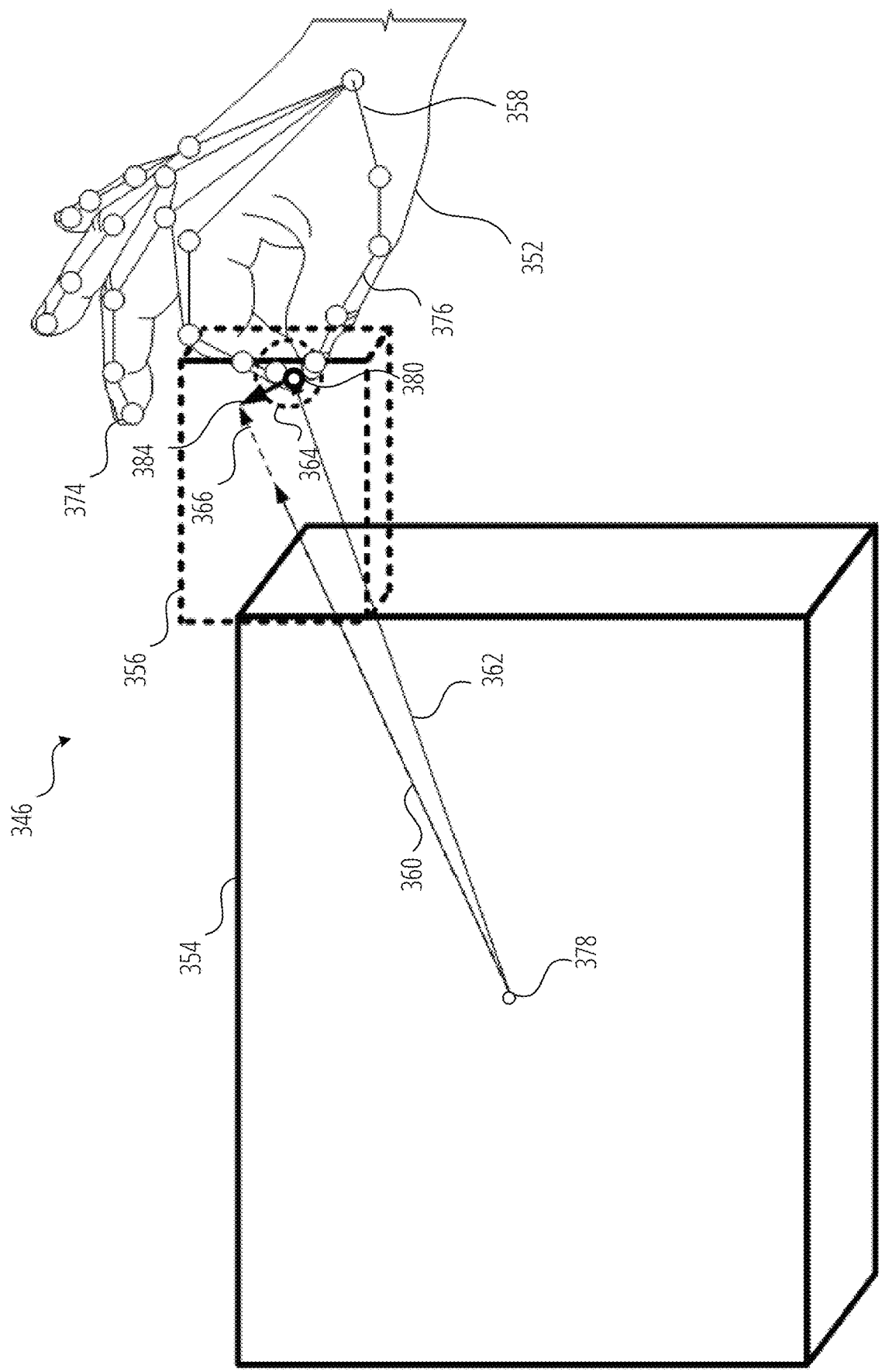

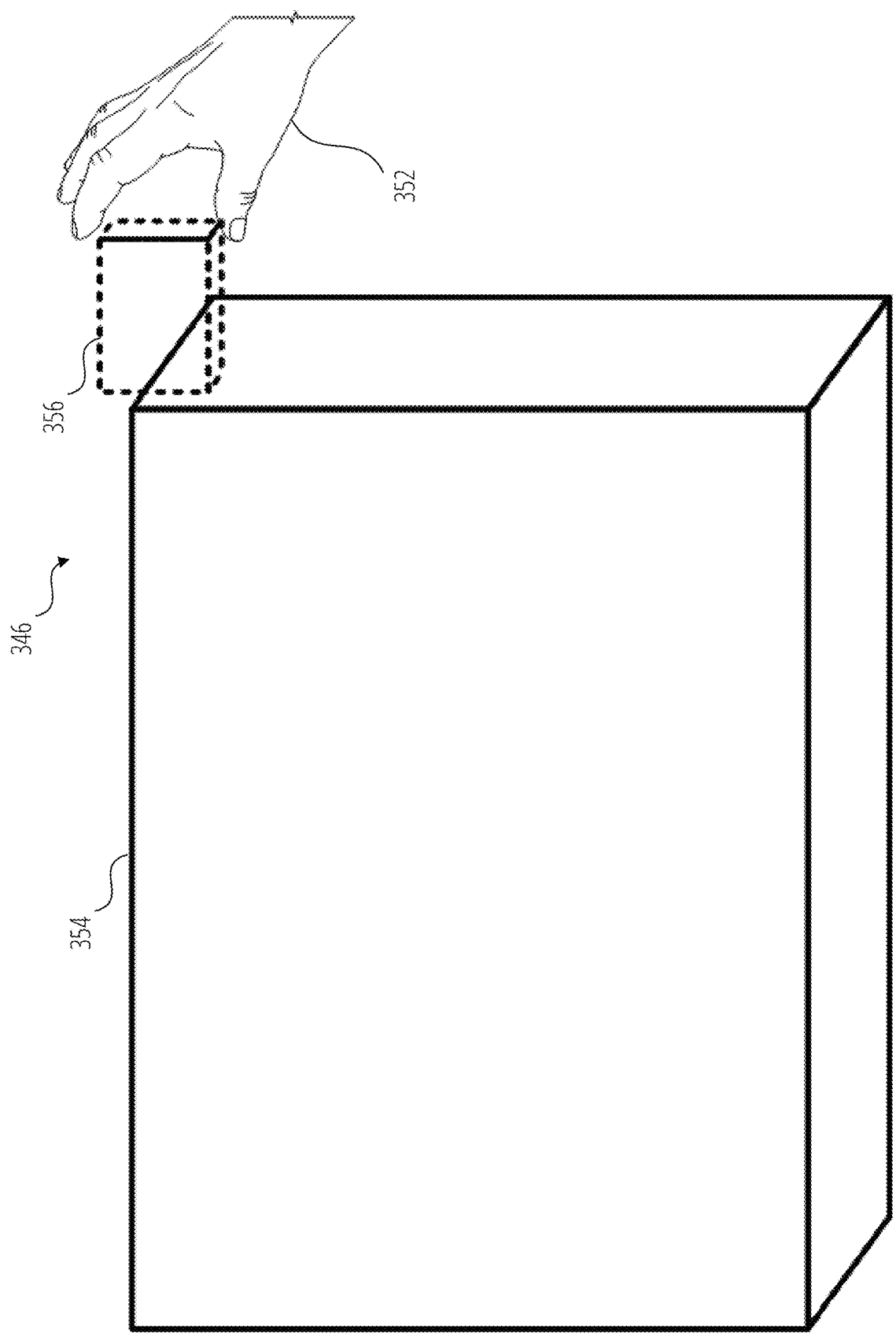

SCALING A 3D VOLUME IN EXTENDED REALITY

TECHNICAL FIELD

The present disclosure relates generally to user interfaces and, more particularly, to user interfaces used for augmented or virtual reality.

BACKGROUND

A head-wearable apparatus may be implemented with a transparent or semi-transparent display through which a user of the head-wearable apparatus can view the surrounding environment. Such head-wearable apparatuses enable a user to see through the transparent or semi-transparent display to view the surrounding environment, and to also see objects (e.g., virtual objects such as a rendering of a 2D or 3D graphic model, images, video, text, and so forth) that are generated for display to appear as a part of, and/or overlaid upon, the surrounding environment. This is typically referred to as "augmented reality" or "AR." A head-wearable apparatus may additionally completely occlude a user's visual field and display a virtual environment through which a user may move or be moved. This is typically referred to as "virtual reality" or "VR." In a hybrid form, a view of the surrounding environment is captured using cameras, and then that view is displayed along with augmentation to the user on displays the occlude the user's eyes. As used herein, the term eXtended Reality (XR) refers to augmented reality, virtual reality and any of hybrids of these technologies unless the context indicates otherwise.

A user of the head-wearable apparatus may access and use a computer software application to perform various tasks or engage in an entertaining activity. To use the computer software application, the user interacts with a user interface provided by the head-wearable apparatus.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which:

FIG. 3D is another illustration of using a pinch hand pose or pinch gesture to rescale a virtual object, in accordance with some examples.

FIG. 3E is another illustration of using a pinch hand pose or pinch gesture to rescale a virtual object, in accordance with some examples.

DETAILED DESCRIPTION

Hand-tracking is a way to provide user inputs from a user into an XR user interface provided by an XR system. The XR system tracks one or more of the user's hands using cameras and computer vision methodologies. The XR system determines hand poses or gestures being made by the user based on video images captured by the cameras. In some XR systems, the XR user interface includes one or more virtual objects that are manipulated by the user, termed Direct Manipulation of Virtual Objects (DMVO). Manipulation of the virtual objects may include operations to change an appearance of the virtual object, such as scaling the virtual object to be either larger or smaller. As the XR system may not have a keyboard, pointing device, or may not even be able to track both hands of the user, methodologies for determining the user's intent during a scaling operation of a virtual object using one hand of the user are desirable.

Certain examples of the present disclosure provide methodologies for scaling a virtual object using a pinch hand pose or pinch gesture. The user makes a pinching hand pose or pinching gesture in a location near the virtual object. The virtual object is scaled, either increasing in size or decreasing in size, depending on the location that the user pinched.

In some examples, an XR system provides to a user an XR user interface where the XR user interface includes a virtual object displayed to the user. The XR system determines a pinch location of a pinch hand pose being made by the user and scales the virtual object based on the pinch location and a virtual object center point of the virtual object. The XR system redisplays the scaled virtual object to the user in the XR user interface.

In some examples, determining a pinch location further includes capturing, using one or more cameras of the XR system, tracking video frame data. The XR system determines hand-tracking data based on the tracking video frame data and determines the pinch location based on the hand-tracking data.

In some examples, scaling the virtual object based on the pinch location and the virtual object center point of the virtual object further includes generating a virtual object vector based on a center point of the virtual object and the pinch location, and generating a pinch vector based on the center point of the virtual object and a virtual object pinch collider of the virtual object. The XR system scales the virtual object based on the virtual object vector and the pinch vector.

In some examples, the XR system detects that the pinch hand pose is still being held by the user, and in response to detecting that the pinch hand pose is still being held, continues to scale the virtual object based on the scaling vector.

In some examples, the XR system includes a head-wearable apparatus.

Other technical features may be readily apparent to one skilled in the art from the following figures, descriptions, and claims.

Figure 1A:
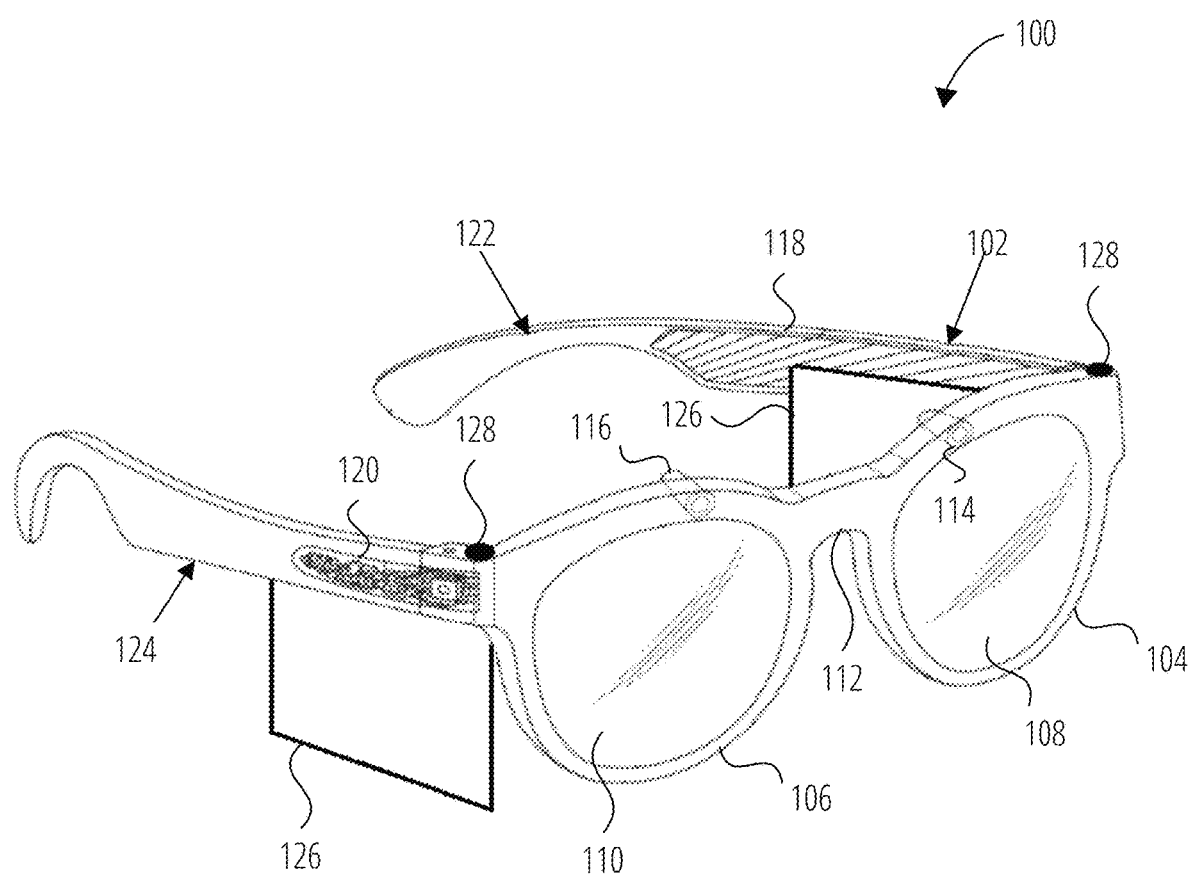
FIG. 1A is a perspective view of a head-worn device, in accordance with some examples.

FIG. 1A is a perspective view of a head-wearable apparatus 100 in accordance with some examples. The head-wearable apparatus 100 may be a client device of an XR system, such a computing system 502 of FIG. 5. The head-wearable apparatus 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. The right optical element 110 and the left optical element 108 can be a lens, a display, a display assembly, or a combination of the foregoing. Any suitable display assembly can be provided in the head-wearable apparatus 100.

The frame 102 additionally includes a left arm or left temple piece 122 and a right arm or right temple piece 124. In some examples the frame 102 can be formed from a single piece of material so as to have a unitary or integral construction.

The head-wearable apparatus 100 can include a computing device, such as a computer 120, which can be of any suitable type so as to be carried by the frame 102 and, in one or more examples, of a suitable size and shape, so as to be partially disposed in one of the left temple piece 122 or the right temple piece 124. The computer 120 can include one or more processors with memory, wireless communication circuitry, and a power source. As discussed below, the computer 120 comprises low-power circuitry 426, high-speed circuitry 428, and a display processor. Various other examples may include these elements in different configurations or integrated together in different ways. Additional details of aspects of the computer 120 may be implemented as illustrated by the machine 200 discussed herein.

The computer 120 additionally includes a battery 118 or other suitable portable power supply. In some examples, the battery 118 is disposed in left temple piece 122 and is electrically coupled to the computer 120 disposed in the right temple piece 124. The head-wearable apparatus 100 can include a connector or port (not shown) suitable for charging the battery 118, a wireless receiver, transmitter or transceiver (not shown), or a combination of such devices.

The head-wearable apparatus 100 includes a first or left camera 114 and a second or right camera 116. Although two cameras are depicted, other examples contemplate the use of a single or additional (i.e., more than two) cameras.

In some examples, the head-wearable apparatus 100 includes any number of input sensors or other input/output devices in addition to the left camera 114 and the right camera 116. Such sensors or input/output devices can additionally include biometric sensors, location sensors, motion sensors, and so forth.

In some examples, the left camera 114 and the right camera 116 provide tracking video frame data for use by the head-wearable apparatus 100 to extract 3D information from a real-world scene.

The head-wearable apparatus 100 may also include a touchpad 126 mounted to or integrated with one or both of the left temple piece 122 and right temple piece 124. The touchpad 126 is generally vertically-arranged, approximately parallel to a user's temple in some examples. As used herein, generally vertically aligned means that the touchpad is more vertical than horizontal, although potentially more vertical than that. Additional user input may be provided by one or more buttons 128, which in the illustrated examples are provided on the outer upper edges of the left optical element holder 104 and right optical element holder 106. The one or more touchpads 126 and buttons 128 provide a means whereby the head-wearable apparatus 100 can receive input from a user of the head-wearable apparatus 100.

Figure 1B:
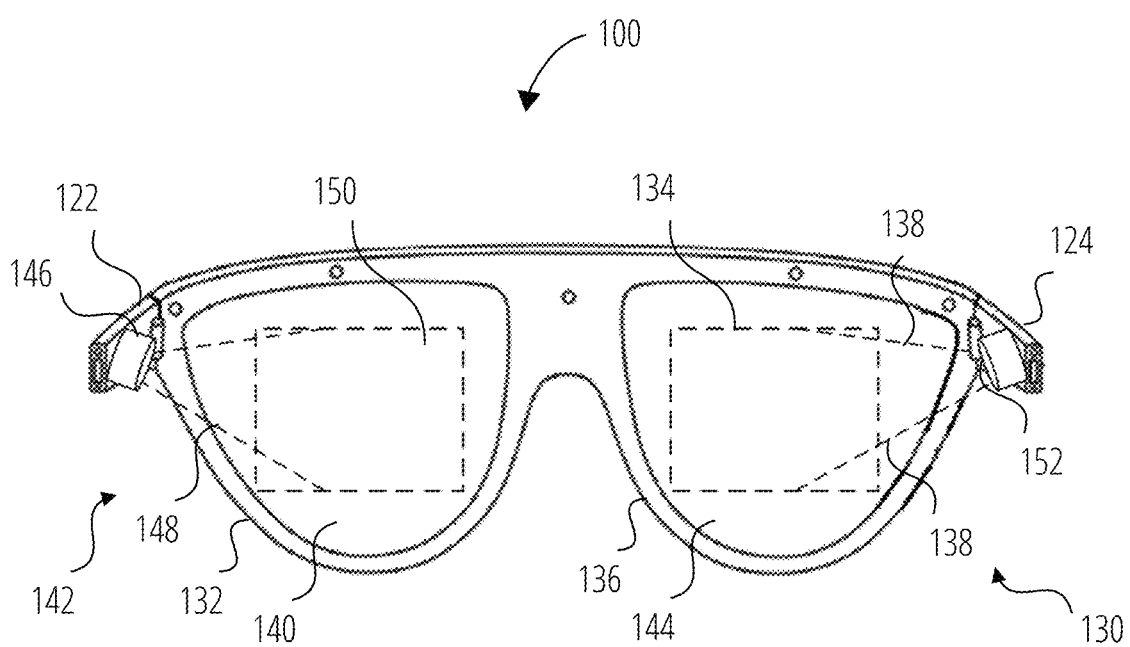
FIG. 1B illustrates a further view of the head-worn device of FIG. 1A, in accordance with some examples.

FIG. 1B illustrates the head-wearable apparatus 100 from the perspective of a user while wearing the head-wearable apparatus 100. For clarity, a number of the elements shown in FIG. 1A have been omitted. As described in FIG. 1A, the head-wearable apparatus 100 shown in FIG. 1B includes left optical element 140 and right optical element 144 secured within the left optical element holder 132 and the right optical element holder 136 respectively.

The head-wearable apparatus 100 includes right forward optical assembly 130 comprising a left near eye display 150, a right near eye display 134, and a left forward optical assembly 142 including a left projector 146 and a right projector 152.

In some examples, the near eye displays are waveguides. The waveguides include reflective or diffractive structures (e.g., gratings and/or optical elements such as mirrors, lenses, or prisms). Light 138 emitted by the right projector 152 encounters the diffractive structures of the waveguide of the right near eye display 134, which directs the light towards the right eye of a user to provide an image on or in the right optical element 144 that overlays the view of the real-world scene seen by the user. Similarly, light 148 emitted by the left projector 146 encounters the diffractive structures of the waveguide of the left near eye display 150, which directs the light towards the left eye of a user to provide an image on or in the left optical element 140 that overlays the view of the real-world scene seen by the user. The combination of a Graphical Processing Unit, an image display driver, the right forward optical assembly 130, the left forward optical assembly 142, left optical element 140, and the right optical element 144 provide an optical engine of the head-wearable apparatus 100. The head-wearable apparatus 100 uses the optical engine to generate an overlay of the real-world scene view of the user including display of a user interface to the user of the head-wearable apparatus 100.

It will be appreciated however that other display technologies or configurations may be utilized within an optical engine to display an image to a user in the user's field of view. For example, instead of a projector and a waveguide, an LCD, LED or other display panel or surface may be provided.

Figure 4:
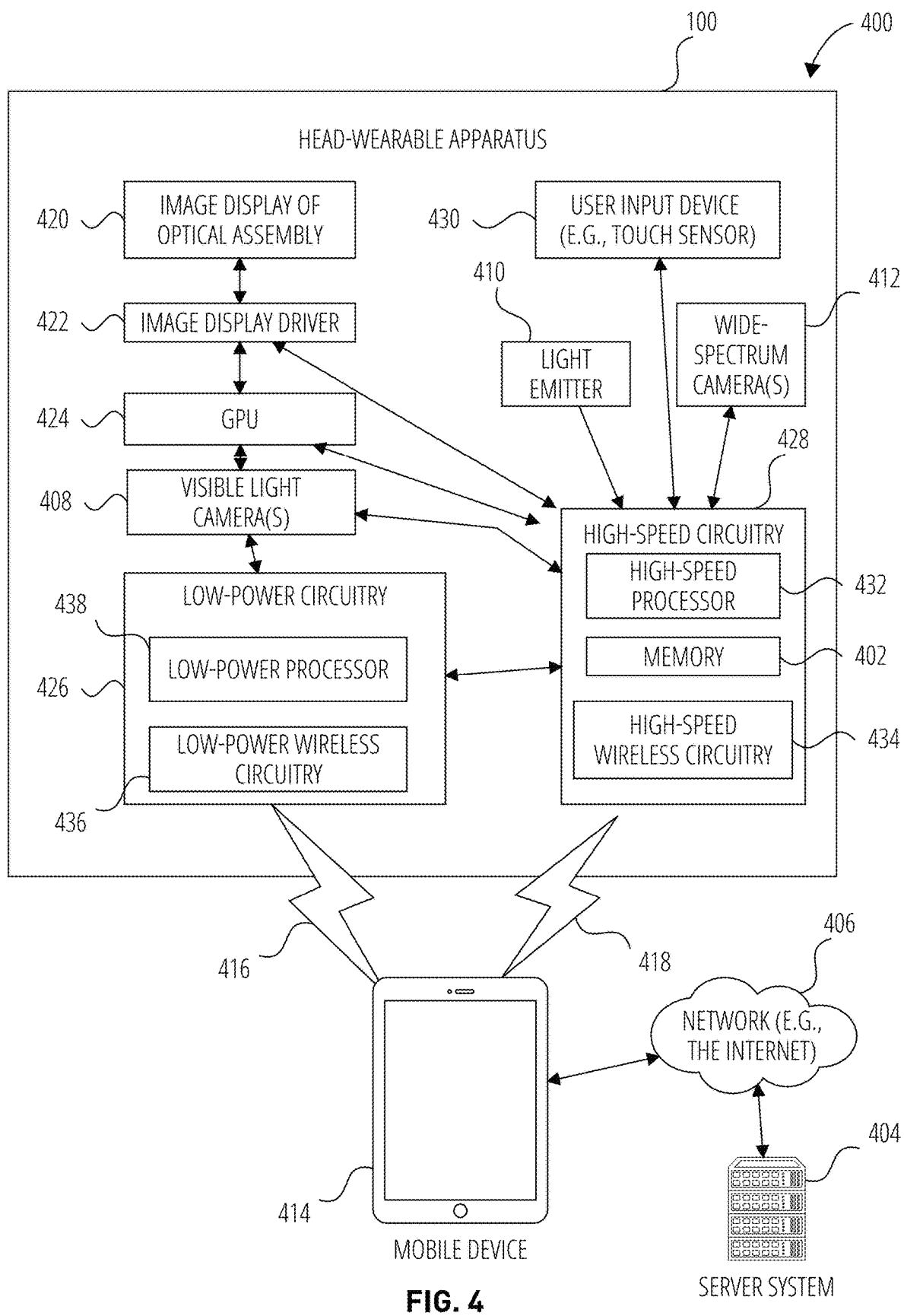
FIG. 4 illustrates a system of a head-wearable apparatus, in accordance with some examples.

In use, a user of the head-wearable apparatus 100 will be presented with information, content and various user interfaces on the near eye displays. As described in more detail herein, the user can then interact with the head-wearable apparatus 100 using a touchpad 126 and/or the button 128, voice inputs or touch inputs on an associated device (e.g.

mobile device 414 illustrated in FIG. 4), and/or hand movements, locations, and positions recognized by the head-wearable apparatus 100.

In some examples, an optical engine of an XR system is incorporated into a lens that is contact with a user's eye, such as a contact lens or the like. The XR system generates images of an XR experience using the contact lens.

In some examples, the head-wearable apparatus 100 comprises an XR system. In some examples, the head-wearable apparatus 100 is a component of an XR system including additional computational components. In some examples, the head-wearable apparatus 100 is a component in an XR system comprising additional user input systems or devices.

Machine Architecture

Figure 2:
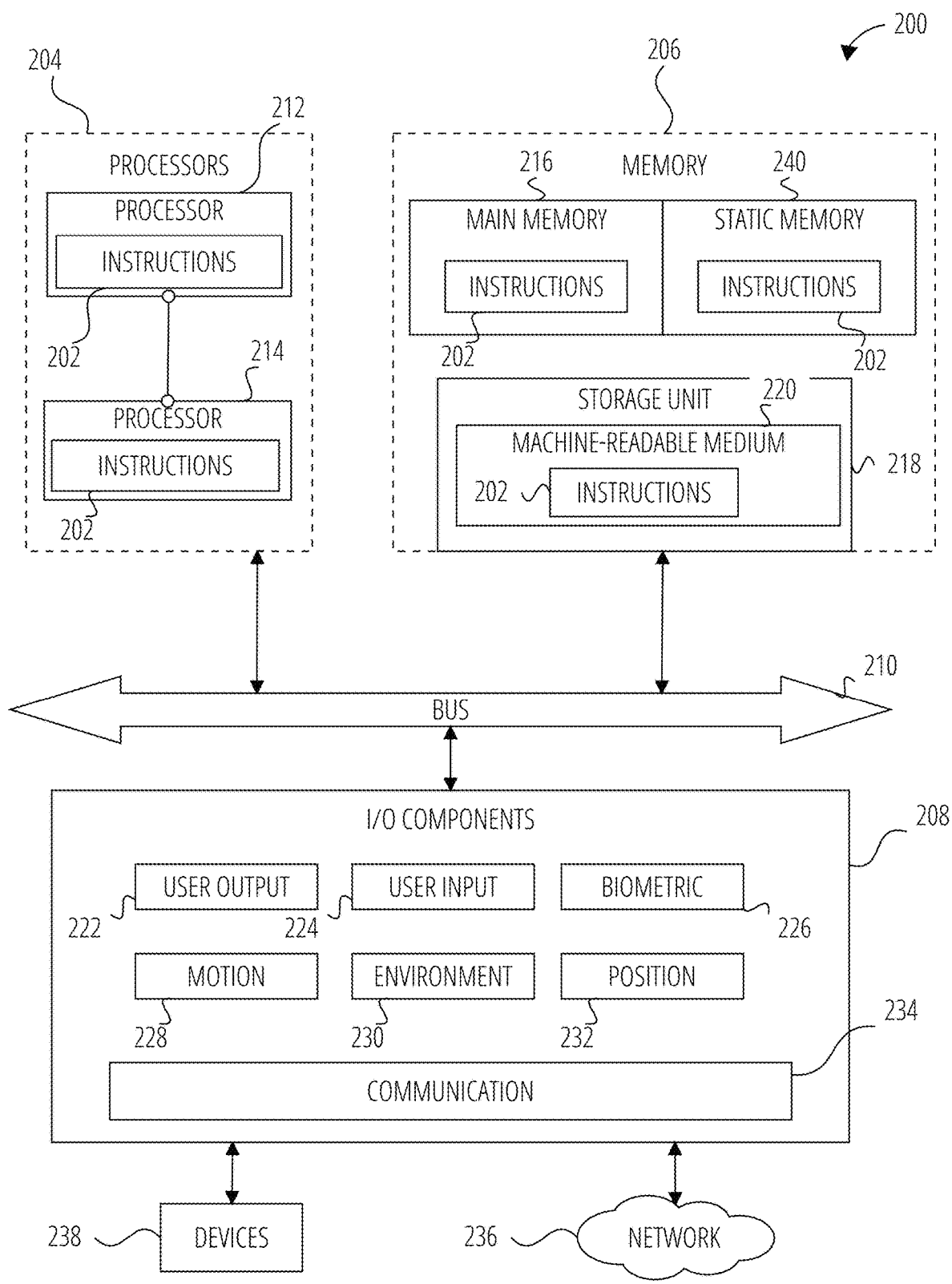
FIG. 2 is a diagrammatic representation of a machine in the form of a computer system within which a set of instructions may be executed to cause the machine to perform any one or more of the methodologies discussed herein, in accordance with some examples.

FIG. 2 is a diagrammatic representation of the machine 200 within which instructions 202 (e.g., software, a program, an application, an applet, an app, or other executable code) for causing the machine 200 to perform any one or more of the methodologies discussed herein may be executed. For example, the instructions 202 may cause the machine 200 to execute any one or more of the methods described herein. The instructions 202 transform the general, non-programmed machine 200 into a particular machine 200 programmed to carry out the described and illustrated functions in the manner described. The machine 200 may operate as a standalone device or may be coupled (e.g., networked) to other machines. In a networked deployment, the machine 200 may operate in the capacity of a server machine or a client machine in a server-client network environment, or as a peer machine in a peer-to-peer (or distributed) network environment. The machine 200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 202, sequentially or otherwise, that specify actions to be taken by the machine 200. Further, while a single machine 200 is illustrated, the term "machine" shall also be taken to include a collection of machines that individually or jointly execute the instructions 202 to perform any one or more of the methodologies discussed herein. The machine 200, for example, may comprise the computing system 502 or any one of multiple server devices forming part of the interaction server system 510. In some examples, the machine 200 may also comprise both client and server systems, with certain operations of a particular method or algorithm being performed on the server-side and with certain operations of the particular method or algorithm being performed on the client-side.

The machine 200 may include processors 204, memory 206, and input/output I/O components 208, which may be configured to communicate with each other via a bus 210. In an example, the processors 204 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 212 and a processor 214 that execute the instructions 202. The term "processor" is intended to include multi-core processors that may comprise two or more independent processors (sometimes referred to as "cores") that may execute instructions contemporaneously. Although FIG. 2 shows multiple processors 204, the machine 200 may include a single processor with a single-core, a single processor with multiple cores (e.g., a multi-core processor), multiple processors with a single core, multiple processors with multiples cores, or any combination thereof.

The memory 206 includes a main memory 216, a static memory 240, and a storage unit 218, both accessible to the processors 204 via the bus 210. The main memory 216, the static memory 240, and storage unit 218 store the instructions 202 embodying any one or more of the methodologies or functions described herein. The instructions 202 may also reside, completely or partially, within the main memory 216, within the static memory 240, within machine-readable medium 220 within the storage unit 218, within at least one of the processors 204 (e.g., within the processor's cache memory), or any suitable combination thereof, during execution thereof by the machine 200.

The I/O components 208 may include a wide variety of components to receive input, provide output, produce output, transmit information, exchange information, capture measurements, and so on. The specific I/O components 208 that are included in a particular machine will depend on the type of machine. For example, portable machines such as mobile phones may include a touch input device or other such input mechanisms, while a headless server machine will likely not include such a touch input device. It will be appreciated that the I/O components 208 may include many other components that are not shown in FIG. 2. In various examples, the I/O components 208 may include user output components 222 and user input components 224. The user output components 222 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 224 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 208 may include biometric components 226, motion components 228, environmental components 230, or position components 232, among a wide array of other components. For example, the biometric components 226 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 228 include acceleration sensor components (e.g., accelerometer), gravitation sensor components, rotation sensor components (e.g., gyroscope).

The environmental components 230 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), depth or distance sensors (e.g., sensors to determine a distance to an object or a depth in a 3D coordinate system of features of an object), or other components that may provide indications, measurements, or signals corresponding to a surrounding physical environment.

With respect to cameras, the computing system 502 may have a camera system comprising, for example, front cameras on a front surface of the computing system 502 and rear cameras on a rear surface of the computing system 502. The front cameras may, for example, be used to capture still images and video of a user of the computing system 502 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the computing system 502 may also include a 360° camera for capturing 360° photographs and videos.

Further, the camera system of the computing system 502 may include dual rear cameras (e.g., a primary camera as well as a depth-sensing camera), or even triple, quad or penta rear camera configurations on the front and rear sides of the computing system 502. These multiple cameras systems may include a wide camera, an ultra-wide camera, a telephoto camera, a macro camera, and a depth sensor, for example.

The position components 232 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 208 further include communication components 234 operable to couple the machine 200 to a network 236 or devices 238 via respective coupling or connections. For example, the communication components 234 may include a network interface component or another suitable device to interface with the network 236. In further examples, the communication components 234 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 238 may be another machine or any of a wide variety of peripheral devices (e.g., a peripheral device coupled via a USB).

Moreover, the communication components 234 may detect identifiers or include components operable to detect identifiers. For example, the communication components 234 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 234, such as location via Internet Protocol (IP) geolocation, location via Wi-Fi® signal triangulation, location via detecting an NFC beacon signal that may indicate a particular location, and so forth.

The various memories (e.g., main memory 216, static memory 240, and memory of the processors 204) and storage unit 218 may store one or more sets of instructions and data structures (e.g., software) embodying or used by any one or more of the methodologies or functions described herein. These instructions (e.g., the instructions 202), when executed by processors 204, cause various operations to implement the disclosed examples.

The instructions 202 may be transmitted or received over the network 236, using a transmission medium, via a network interface device (e.g., a network interface component included in the communication components 234) and using any one of several well-known transfer protocols (e.g., hypertext transfer protocol (HTTP)). Similarly, the instructions 202 may be transmitted or received using a transmission medium via a coupling (e.g., a peer-to-peer coupling) to the devices 238.

Figure 3A:
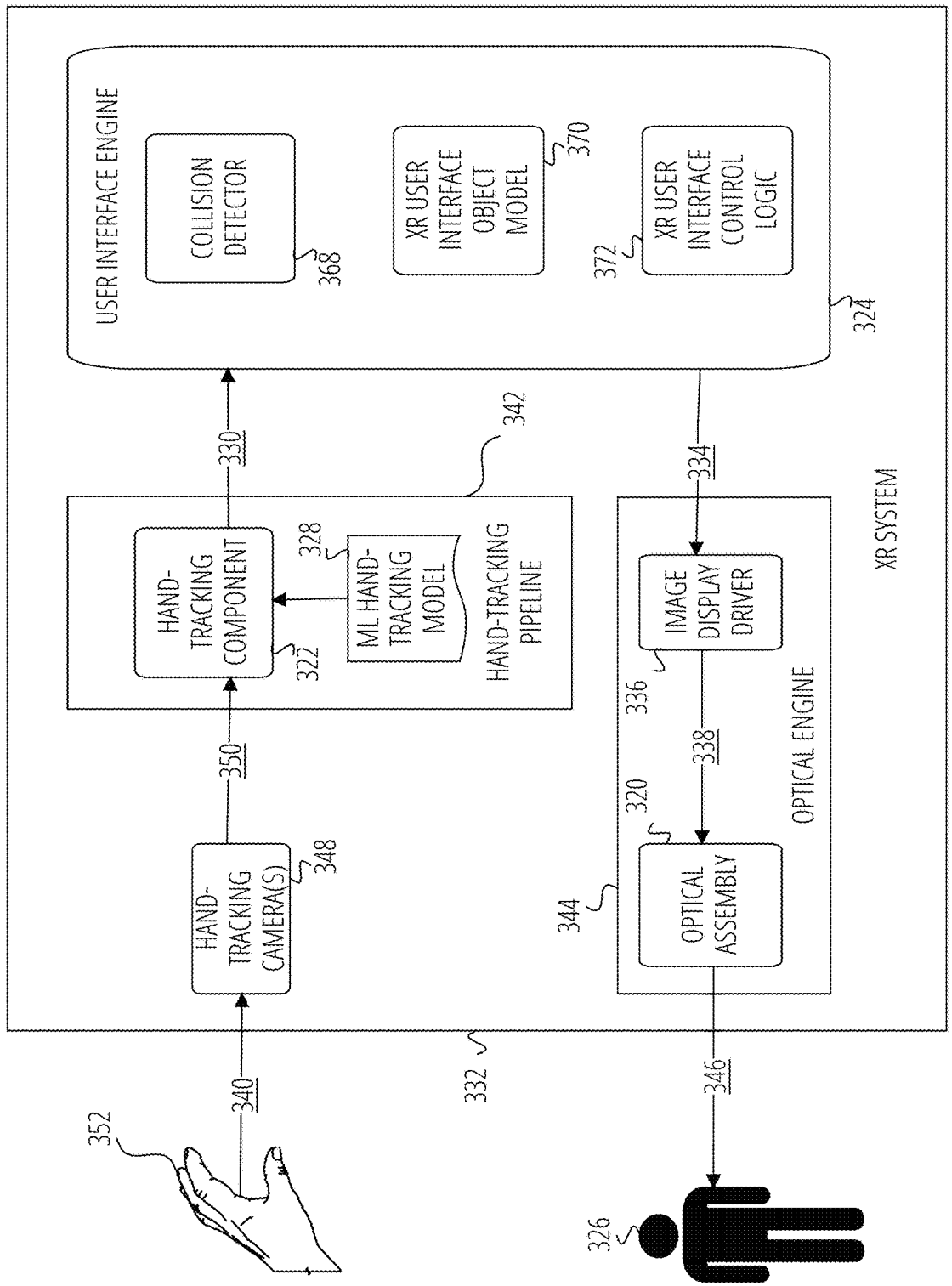
FIG. 3A illustrates a collaboration diagram of components of an XR system using hand-tracking for user input, in accordance with some examples.
Figure 3B:
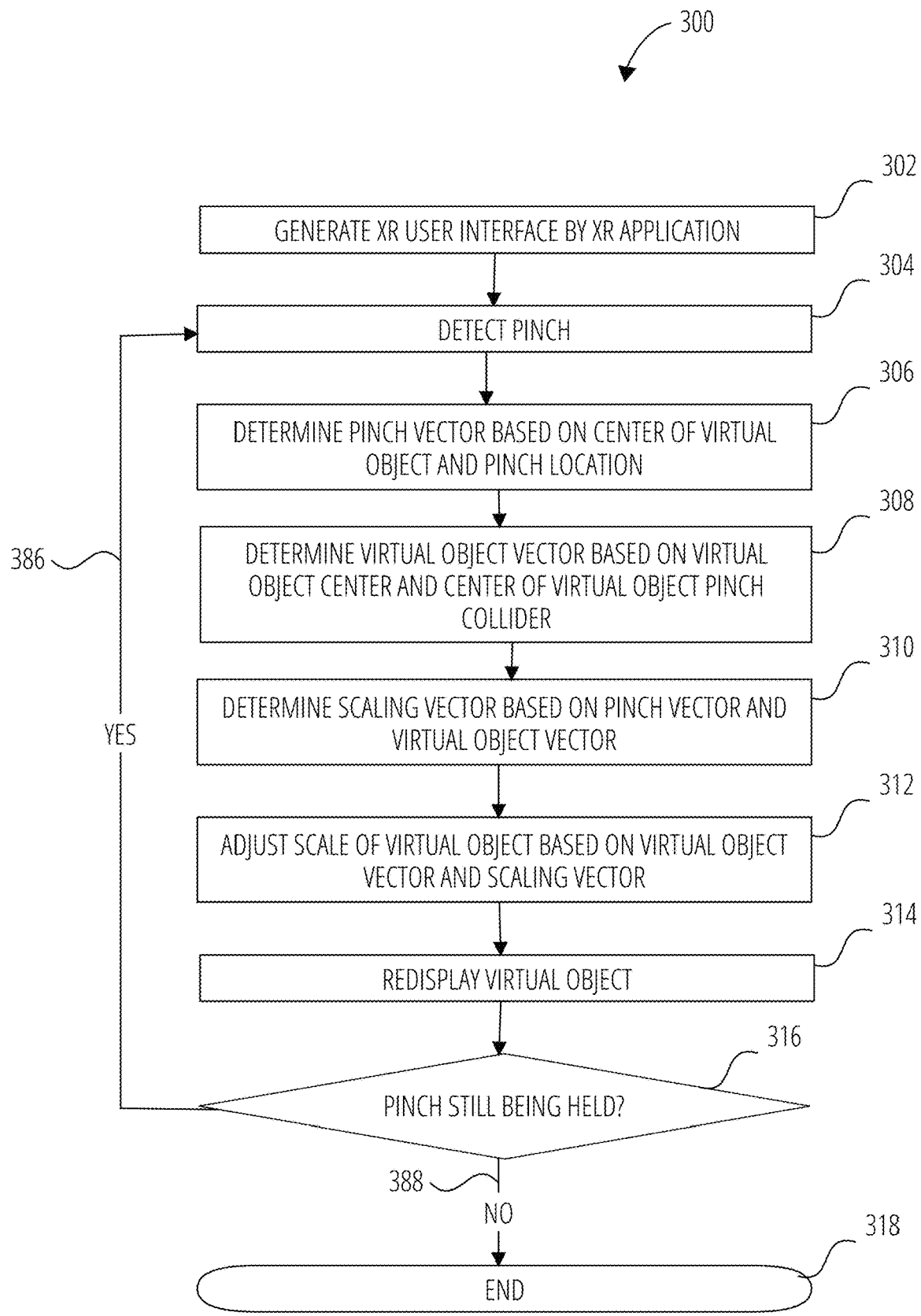
FIG. 3B illustrates a process flow diagram of a method of using a pinch hand pose or pinch gesture as user input, in accordance with some examples.
Figure 3C:
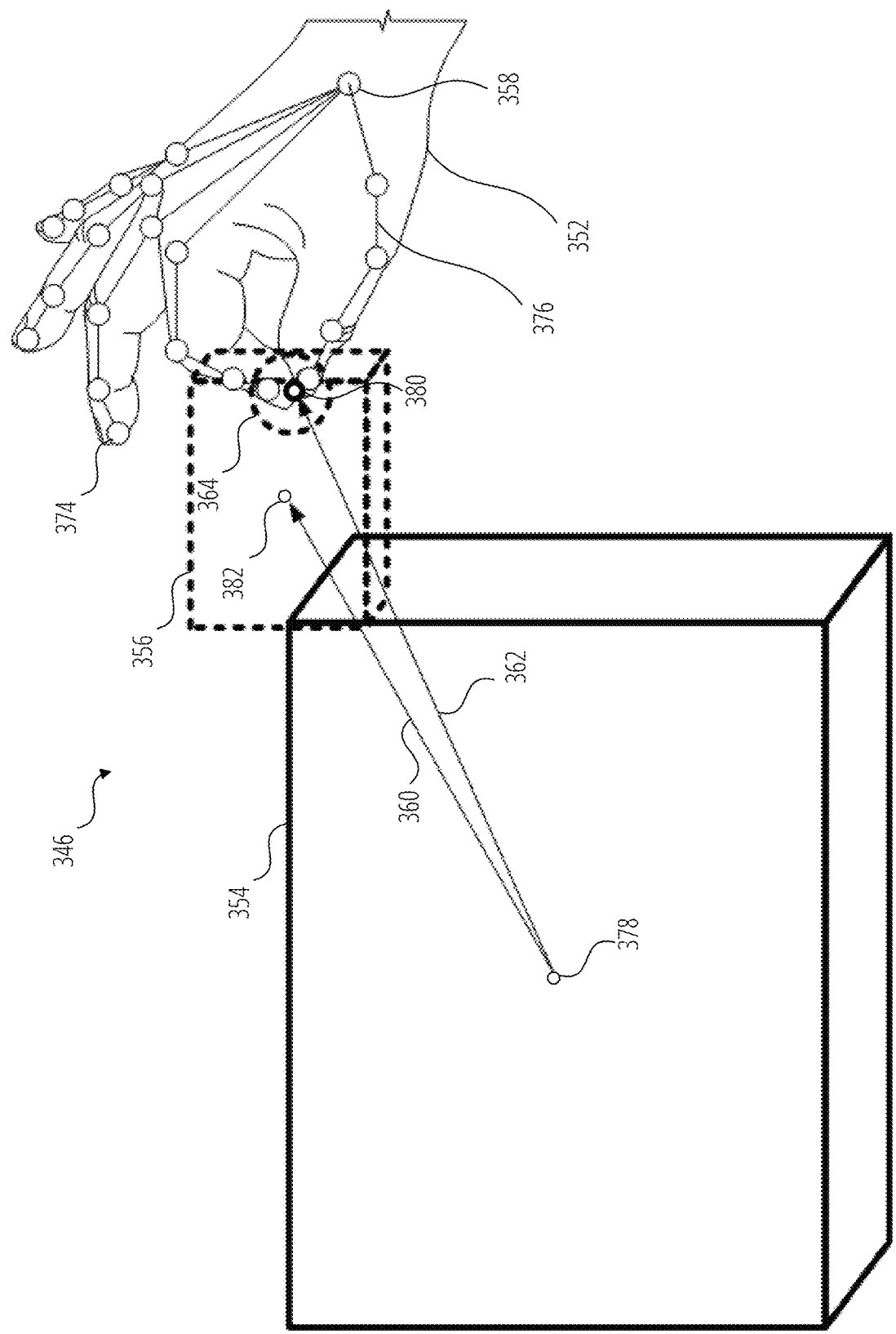
FIG. 3C illustrates using a pinch hand pose or pinch gesture to rescale a virtual object, in accordance with some examples.

FIG. 3A illustrates a collaboration diagram of components of an XR system using hand-tracking for user input, FIG. 3B illustrates a process flow diagram of a method of using a pinch hand pose or pinch gesture as user input, and FIG. 3C, FIG. 3D, and FIG. 3E illustrate using a pinch hand pose or pinch gesture to rescale a virtual object, in accordance with some examples.

Although a method of scaling virtual objects 300 of FIG. 3B depicts a particular sequence of operations, the sequence may be altered without departing from the scope of the present disclosure. For example, some of the operations depicted may be performed in parallel, in a different sequence, or by different components of an XR system, that does not materially affect the function of the method.

The method of scaling virtual objects 300 is used by an XR system, such as head-wearable apparatus 100 (of FIG. 1A), to provide a continuous real-time input modality to a user of the XR system where the user interacts with an XR user interface 346 using hand gestures or hand poses. The AR application may be a useful application such as an interactive game, maintenance guide, an interactive map, an interactive tour guide, a tutorial, or the like. The AR application may also be an entertainment application such as a video game, an interactive video, or the like.

In operation 302, the XR system 332 generates the XR user interface 346 provided to a user 326. For example, a user interface engine 324 includes XR user interface control logic 372 comprising a dialog script or the like that specifies a user interface dialog implemented by the XR user interface 346. The XR user interface control logic 372 also comprises one or more actions that are to be taken by the XR system based on detecting various dialog events such as user inputs. The user interface engine 324 further includes an XR user interface object model 370. The XR user interface object model 370 includes 3D coordinate data of one or more virtual objects, such as virtual object 354, and 3D coordinate data of one or more pinch box colliders associated with the virtual object 354, such as virtual object pinch collider 356. The virtual object pinch collider 356 is a virtual object that a user 326 interacts with in order to adjust a parameter of the virtual object 354 such as, but not limited to, a scale of the virtual object 354. The XR user interface object model 370 also includes 3D graphics data of the virtual object 354 and the virtual object pinch collider 356. The 3D graphics data is used by an optical engine 344 to generate the XR user interface 346 for display to the user 326.

In some examples, a shape of the virtual object pinch collider 356 can comprise one or more irregular or regular 3D geometric shapes such as, but not limited to, a regular or irregular polyhedron, a spheroid, a conoid shape, or the like. In some examples, a shape of the virtual object pinch collider 356 is based on one or more 3D geometric features of the virtual object 354.

The user interface engine 324 generates XR user interface graphics data 334 based on the XR user interface object model 370. The XR user interface graphics data 334 includes image video data of the one or more virtual objects of the XR user interface 346. The user interface engine 324 communicates the XR user interface graphics data 334 to an image display driver 336 of an optical engine 344 of the XR system 332. The image display driver 336 receives the XR user interface graphics data 334 and generates display control signals 338 based on the XR user interface graphics data 334. The image display driver 336 uses the display control signals 338 to control the operations of one or more optical assemblies 320 of the optical engine 344. In response to the display control signals 338, the one or more optical assemblies 320 generate visible images of the XR user interface 346 that are provided to the user 326.

In operation 304, the XR system 332 detects a pinch hand pose or gesture made by the user 326. For example, the XR system 332 uses one or more hand-tracking cameras 348 to capture tracking video frame data 350 of hand poses 340 or gestures being made by the user 326 using one or more of the user's hands 352. The hand-tracking cameras 348 communicate the tracking video frame data 350 to a hand-tracking component 322 of a hand-tracking pipeline 342 of the XR system 332.

The hand-tracking component 322 receives the tracking video frame data 350 and generates hand-tracking data 330 based on the tracking video frame data 350. The hand-tracking data 330 comprises skeletal model data of one or more skeletal models of the one or more hands 352 of the user, such as skeletal model 358, in a 3D coordinate system based on the landmark features extracted from the tracking video frame data 350, and hand pose categorization data of a hand pose 340 or gesture being made by the user's one or more hands 352. The skeletal models comprise skeletal model features, such as node 374, that correspond to recognized visual landmarks of portions of the one or more hands 352 of the user 326. In some examples, the hand-tracking data 330 includes landmark data such as landmark identification, a physical location of the landmark, links between joints of the user's fingers, such as link 376, and categorization information of one or more landmarks associated with the one or more hands 352 of the user 326. In some examples, the hand pose categorization data includes an indication of a pinch hand pose or pinch gesture being made by one or more of the hands 352 of the user 326.

For example, the hand-tracking component 322 recognizes landmark features on portions of the one or more hands 352 of the user 326 captured in the tracking video frame data 350. In some examples, the hand-tracking component 322 extracts landmarks of the one or more hands 352 of the user 326 from the tracking video frame data 350 using computer vision methodologies including, but not limited to, Harris corner detection, Shi-Tomasi corner detection, Scale-Invariant Feature Transform (SIFT), Speeded-Up Robust Features (SURF), Features from Accelerated Segment Test (FAST), Oriented FAST and Rotated BRIEF (ORB), and the like.

In some examples, the hand-tracking component 322 generates the hand pose categorization data and the sequence of skeletal models of hand-tracking data 330 based on the landmarks extracted from the tracking video frame data 350 using artificial intelligence methodologies and an ML hand-tracking model 328 that was previously generated using machine learning methodologies. In some examples, an ML hand-tracking model 328 comprises, but is not limited to, a neural network, a learning vector quantization network, a logistic regression model, a support vector machine, a random decision forest, a naïve Bayes model, a linear discriminant analysis model, and a K-nearest neighbor model. In some examples, machine learning methodologies used to generate the ML hand-tracking model 328 may include, but are not limited to, supervised learning, unsupervised learning, semi-supervised learning, reinforcement learning, dimensionality reduction, self-learning, feature learning, sparse dictionary learning, and anomaly detection.

In some examples, the hand-tracking component 322 generates the hand pose categorization data and the sequence of skeletal models of the hand-tracking data 330 based on the landmarks extracted from the tracking video frame data 350 using geometric methodologies.

In some examples, a pinch hand pose or pinch gesture comprises a user touching the fingertip of the forefinger of one of their hands to the fingertip of the thumb of the same hand.

In some examples, the pinch hand pose or pinch gesture is determined by detecting a sequence of proto hand poses or proto gestures as the user moves the fingertip of the forefinger of one of their hands closer to the fingertip of the thumb of the same hand.

The hand-tracking component 322 of the XR system 332 communicates the hand-tracking data 330 to the user interface engine 324. The user interface engine 324 detects that the user 326 is making a pinch hand pose or pinch gesture based on the hand pose categorization data of the hand-tracking data 330.

In response to detecting that the user 326 is making a pinch hand pose or pinch gesture, the user interface engine 324 uses a collision detector 368 to determine whether the pinch hand pose or pinch gesture is being made within the virtual object pinch collider 356 of the virtual object 354. The determination is made by the collision detector 368 based on the skeletal model data of the hand-tracking data 330 and the 3D coordinate data of the virtual object pinch collider 356 included in the XR user interface object model 370. For example, the user interface engine 324 determines the 3D coordinate data of a forefinger tip node and a thumb tip node of the skeletal model 358. The user interface engine 324 generates a pinch location collider 364 based on the 3D coordinate data of the forefinger tip node and the thumb tip node. The collision detector 368 determines whether the 3D geometries of the virtual object pinch collider 356 and the pinch location collider collide by detecting an intersection between the 3D geometries of the virtual object pinch collider 356 and the pinch location collider 364. In a case of a point collider, a collision is determined if the point collider is located within a volume of another collider.

In some examples, a shape of the pinch location collider 364 can comprise one or more irregular or regular 3D geometric shapes such as, but not limited to, a regular or irregular polyhedron, a spheroid, a conoid shape, or the like. In some examples, a shape of the pinch location collider 364 is based on one or more features of the user's hand 352.

If the collision detector 368 determines that the pinch location collider 364 of the pinch hand pose or pinch gesture collides with the virtual object pinch collider 356, the user interface engine 324 also determines the 3D coordinates of a pinch location 380 as the user 326 is making the pinch hand pose or pinch gesture. In some examples, the 3D coordinates of the pinch location 380 are determined based on a center point of the pinch location collider 364. For example, XR system determines the 3D coordinate data of the pinch location 380 based on the 3D coordinate data of the center point of the pinch location collider 364. In some examples, the 3D coordinates of the pinch location 380 are determined based on the 3D coordinate data of an edge, vertex, or surface of the pinch location collider 364. In some examples, the 3D coordinate data of the pinch location 380 are determined based on intersection of the pinch location collider 364 and the virtual object pinch collider 356.

In operation 306, the XR system determines a pinch vector 362 based on the 3D coordinate data of a virtual object center point 378 of the virtual object 354 and the 3D coordinate data of the pinch location 380. The resulting pinch vector 362 extends from the virtual object center point 378 to the pinch location 380.

In operation 308, the XR system determines a virtual object vector 360 based on the 3D coordinate data of the virtual object center point 378 and the 3D coordinate data of the virtual object collider center point 382 of the virtual object pinch collider 356. The resulting virtual object vector 360 extends from the virtual object center point 378 to the virtual object collider center point 382.

In operation 310, the XR system 332 determines a scaling vector 366 based on the pinch vector 362 and the virtual object vector 360. For example, the XR system projects the pinch vector 362 onto the virtual object vector 360, as indicated by projection 384 of FIG. 3D.

In operation 312, the XR system 332 adjusts a scale of the virtual object 354 based on the virtual object vector 360 and the scaling vector 366. For example, the XR system 332 adjusts the scale of the object based on a ratio of a length of the scaling vector 366 divided by a length of the virtual object vector 360. For example, if the length of the scaling vector 366 is greater than the length of the virtual object vector 360, the scale of the virtual object 354 will be increased. If the length of the scaling vector 366 is less than the length of the virtual object vector 360, the scale of the virtual object 354 will be decreased.

In operation 314, the XR system 332 uses the optical engine 344 to redisplay the virtual object 354 based on the adjusted scale of the virtual object 354, as illustrated in FIG. 3E.

In operation 316, the XR system 332 determines whether the pinch hand pose or pinch gesture is still being held by the user 326. For example, the XR system 332 captures additional tracking video frame data 350 of the hand 352 of the user 326. The XR system generates additional hand-tracking data 330 based on the additional tracking video frame data 350 as described herein. Included in the additional hand-tracking data 330 is additional hand gesture or hand pose categorization data. The user interface engine 324 detects whether the pinch gesture or pinch hand pose gesture is still being held by the user based on the additional hand gesture or hand pose categorization data of the hand-tracking data 330.

In some examples, a release of a pinch hand pose or pinch gesture comprises a user moving the fingertip of the forefinger of one of their hands away from the fingertip of the thumb of the same hand.

In some examples, a release of the pinch hand pose or pinch gesture is determined by detecting a sequence of proto hand poses or proto gestures as the user moves the fingertip of the forefinger of one of their hands away from the fingertip of the thumb of the same hand.

In response to determining that the pinch hand pose or pinch gesture is still being held, the XR system transitions 386 to operation 304 and repeats the process of the scaling the virtual object 354 as described herein. In response to determining that the pinch hand pose or pinch gesture is not being held, the XR system transitions 388 to operation 318 and ends.

In some examples, the XR system performs the functions of the hand-tracking pipeline 342, the user interface engine 324, and the optical engine 344 utilizing various APIs and system libraries.

System with Head-Wearable Apparatus

FIG. 4 illustrates a system 400 including a head-wearable apparatus 100 with a selector input device, according to some examples. FIG. 4 is a high-level functional block diagram of an example head-wearable apparatus 100 communicatively coupled to a mobile device 414 and various server systems 404 (e.g., the interaction server system 510) via various networks 508.

The head-wearable apparatus 100 includes one or more cameras, each of which may be, for example, one or more camera 408, a light emitter 410, and one or more wide-spectrum cameras 412.

The mobile device 414 connects with head-wearable apparatus 100 using both a low-power wireless connection 416 and a high-speed wireless connection 418. The mobile device 414 is also connected to the server system 404 and the network 406.

The head-wearable apparatus 100 further includes two image displays of the image display of optical assembly 420. The two image displays of optical assembly 420 include one associated with the left lateral side and one associated with the right lateral side of the head-wearable apparatus 100. The head-wearable apparatus 100 also includes an image display driver 422, and a GPU 424. The image display of optical assembly 420, image display driver 422, and GPU 424 constitute an optical engine of the head-wearable apparatus 100. The image display of optical assembly 420 is for presenting images and videos, including an image that can include a graphical user interface to a user of the head-wearable apparatus 100.

The image display driver 422 commands and controls the image display of optical assembly 420. The image display driver 422 may deliver image data directly to the image display of optical assembly 420 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 100 includes a frame and stems (or temples) extending from a lateral side of the frame. The head-wearable apparatus 100 further includes a user input device 430 (e.g., touch sensor or push button), including an input surface on the head-wearable apparatus 100. The user input device 430 (e.g., touch sensor or push button)

is to receive from the user an input selection to manipulate the graphical user interface of the presented image.

The components shown in FIG. 4 for the head-wearable apparatus 100 are located on one or more circuit boards, for example a PCB or flexible PCB, in the rims or temples. Alternatively, or additionally, the depicted components can be located in the chunks, frames, hinges, or bridge of the head-wearable apparatus 100. Left and right cameras 408 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 100 includes a memory 402, which stores instructions to perform a subset or all of the functions described herein. The memory 402 can also include storage device.

As shown in FIG. 4, the high-speed circuitry 428 includes a high-speed processor 432, a memory 402, and high-speed wireless circuitry 434. In some examples, the image display driver 422 is coupled to the high-speed circuitry 428 and operated by the high-speed processor 432 in order to drive the left and right image displays of the image display of optical assembly 420. The high-speed processor 432 may be any processor capable of managing high-speed communications and operation of any general computing system needed for the head-wearable apparatus 100. The high-speed processor 432 includes processing resources needed for managing high-speed data transfers on a high-speed wireless connection 418 to a wireless local area network (WLAN) using the high-speed wireless circuitry 434. In certain examples, the high-speed processor 432 executes an operating system such as a LINUX operating system or other such operating system of the head-wearable apparatus 100, and the operating system is stored in the memory 402 for execution. In addition to any other responsibilities, the high-speed processor 432 executing a software architecture for the head-wearable apparatus 100 is used to manage data transfers with high-speed wireless circuitry 434. In certain examples, the high-speed wireless circuitry 434 is configured to implement Institute of Electrical and Electronic Engineers (IEEE) 802.11 communication standards, also referred to herein as WiFi. In some examples, other high-speed communications standards may be implemented by the high-speed wireless circuitry 434.

The low-power wireless circuitry 436 and the high-speed wireless circuitry 434 of the head-wearable apparatus 100 can include short-range transceivers (Bluetooth™) and wireless wide, local, or wide area network transceivers (e.g., cellular or WiFi). Mobile device 414, including the transceivers communicating via the low-power wireless connection 416 and the high-speed wireless connection 418, may be implemented using details of the architecture of the head-wearable apparatus 100, as can other elements of the network 406.

The memory 402 includes any storage device capable of storing various data and applications, including, among other things, camera data generated by the left and right cameras 408, the wide-spectrum cameras 412, and the GPU 424, as well as images generated for display by the image display driver 422 on the image displays of the image display of optical assembly 420. While the memory 402 is shown as integrated with high-speed circuitry 428, in some examples, the memory 402 may be an independent standalone element of the head-wearable apparatus 100. In certain such examples, electrical routing lines may provide a connection through a chip that includes the high-speed processor 432 from the GPU 424 or the low-power processor 438 to the memory 402. In some examples, the high-speed processor 432 may manage addressing of the memory 402 such that the low-power processor 438 will boot the high-speed processor 432 any time that a read or write operation involving memory 402 is needed.

As shown in FIG. 4, the low-power processor 438 or high-speed processor 432 of the head-wearable apparatus 100 can be coupled to the camera (camera 408, light emitter 410, or wide-spectrum cameras 412), the image display driver 422, the user input device 430 (e.g., touch sensor or push button), and the memory 402.

The head-wearable apparatus 100 is connected to a host computer. For example, the head-wearable apparatus 100 is paired with the mobile device 414 via the high-speed wireless connection 418 or connected to the server system 404 via the network 406. The server system 404 may be one or more computing devices as part of a service or network computing system, for example, that includes a processor, a memory, and network communication interface to communicate over the network 406 with the mobile device 414 and the head-wearable apparatus 100.

The mobile device 414 includes a processor and a network communication interface coupled to the processor. The network communication interface allows for communication over the network 406, low-power wireless connection 416, or high-speed wireless connection 418. Mobile device 414 can further store at least portions of the instructions for generating binaural audio content in the mobile device 414's memory to implement the functionality described herein.

Output components of the head-wearable apparatus 100 include visual components, such as a display such as a liquid crystal display (LCD), a plasma display panel (PDP), a light-emitting diode (LED) display, a projector, or a waveguide. The image displays of the optical assembly are driven by the image display driver 422. The output components of the head-wearable apparatus 100 further include acoustic components (e.g., speakers), haptic components (e.g., a vibratory motor), other signal generators, and so forth. The input components of the head-wearable apparatus 100, the mobile device 414, and server system 404, such as the user input device 430, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 100 may also include additional peripheral device elements. Such peripheral device elements may include biometric sensors, additional sensors, or display elements integrated with the head-wearable apparatus 100. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 416 and high-speed wireless connection 418 from the mobile device 414 via the low-power wireless circuitry 436 or high-speed wireless circuitry 434.

Networked Computing Environment

Figure 5:
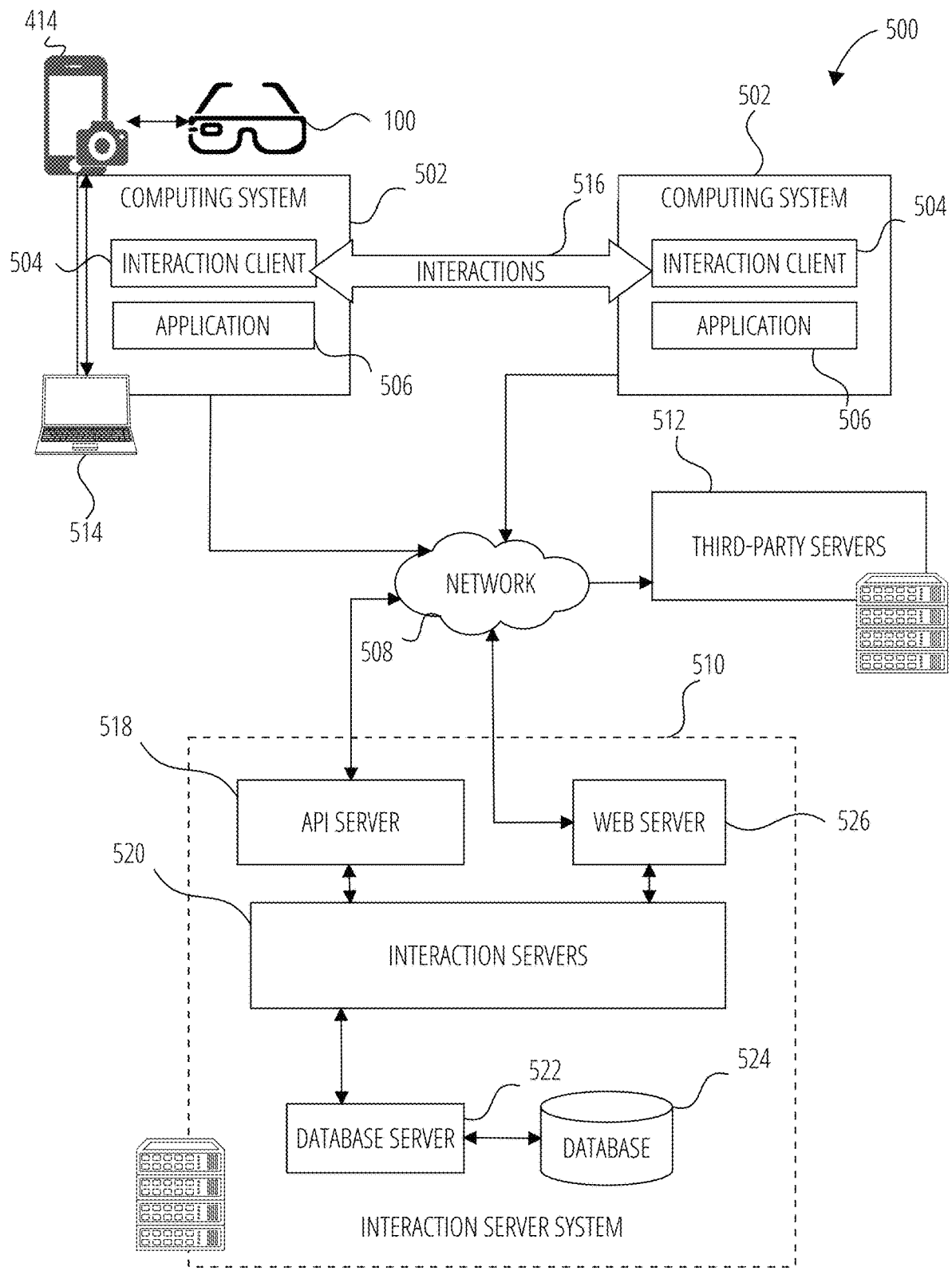
FIG. 5 is a diagrammatic representation of a networked environment in which the present disclosure may be deployed, in accordance with some examples.

FIG. 5 is a block diagram showing an example interaction system 500 for facilitating interactions (e.g., exchanging text messages, conducting text audio and video calls, or playing games) over a network. The interaction system 500 includes multiple XR systems 502, each of which hosts multiple applications, including an interaction client 504 and other applications 506. Each interaction client 504 is communicatively coupled, via one or more communication networks including a network 508 (e.g., the Internet), to other instances of the interaction client 504 (e.g., hosted on respective other XR systems 502), an interaction server system 510 and third-party servers 512). An interaction client 504 can also communicate with locally hosted applications 506 using Applications Program Interfaces (APIs).

Each computing system 502 may comprise one or more user devices, such as a mobile device 414, head-wearable apparatus 100, and a computer client device 514 that are communicatively connected to exchange data and messages.

An interaction client 504 interacts with other interaction clients 504 and with the interaction server system 510 via the network 508. The data exchanged between the interaction clients 504 (e.g., interactions 516) and between the interaction clients 504 and the interaction server system 510 includes functions (e.g., commands to invoke functions) and payload data (e.g., text, audio, video, or other multimedia data).

The interaction server system 510 provides server-side functionality via the network 508 to the interaction clients 504. While certain functions of the interaction system 500 are described herein as being performed by either an interaction client 504 or by the interaction server system 510, the location of certain functionality either within the interaction client 504 or the interaction server system 510 may be a design choice. For example, it may be technically preferable to initially deploy particular technology and functionality within the interaction server system 510 but to later migrate this technology and functionality to the interaction client 504 where a computing system 502 has sufficient processing capacity.

The interaction server system 510 supports various services and operations that are provided to the interaction clients 504. Such operations include transmitting data to, receiving data from, and processing data generated by the interaction clients 504. This data may include message content, client device information, geolocation information, media augmentation and overlays, message content persistence conditions, social network information, and live event information. Data exchanges within the interaction system 500 are invoked and controlled through functions available via user interfaces (UIs) of the interaction clients 504.

Turning now specifically to the interaction server system 510, an Application Program Interface (API) server 518 is coupled to and provides programmatic interfaces to Interaction servers 520, making the functions of the Interaction servers 520 accessible to interaction clients 504, other applications 506 and third-party server 512. The Interaction servers 520 are communicatively coupled to a database server 522, facilitating access to a database 524 that stores data associated with interactions processed by the Interaction servers 520. Similarly, a web server 526 is coupled to the Interaction servers 520 and provides web-based interfaces to the Interaction servers 520. To this end, the web server 526 processes incoming network requests over the Hypertext Transfer Protocol (HTTP) and several other related protocols.

The Application Program Interface (API) server 518 receives and transmits interaction data (e.g., commands and message payloads) between the Interaction servers 520 and the XR systems 502 (and, for example, interaction clients 504 and other application 506) and the third-party server 512. Specifically, the Application Program Interface (API) server 518 provides a set of interfaces (e.g., routines and protocols) that can be called or queried by the interaction client 504 and other applications 506 to invoke functionality of the Interaction servers 520. The Application Program Interface (API) server 518 exposes various functions supported by the Interaction servers 520, including account registration; login functionality; the sending of interaction data, via the Interaction servers 520, from a particular interaction client 504 to another interaction client 504; the communication of media files (e.g., images or video) from an interaction client 504 to the Interaction servers 520; the settings of a collection of media data (e.g., a story); the retrieval of a list of friends of a user of a computing system 502; the retrieval of messages and content; the addition and deletion of entities (e.g., friends) to an entity graph (e.g., a social graph); the location of friends within a social graph; and opening an application event (e.g., relating to the interaction client 504).

The interaction servers 520 host multiple systems and subsystems, described below with reference to FIG. 7.

Linked Applications

Returning to the interaction client 504, features and functions of an external resource (e.g., a linked application 506 or applet) are made available to a user via an interface of the interaction client 504. In this context, "external" refers to the fact that the application 506 or applet is external to the interaction client 504. The external resource is often provided by a third party but may also be provided by the creator or provider of the interaction client 504. The interaction client 504 receives a user selection of an option to launch or access features of such an external resource. The external resource may be the application 506 installed on the computing system 502 (e.g., a "native app"), or a small-scale version of the application (e.g., an "applet") that is hosted on the computing system 502 or remote of the computing system 502 (e.g., on third-party servers 512). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 504. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 504 determines whether the selected external resource is a web-based external resource or a locally-installed application 506. In some cases, applications 506 that are locally installed on the computing system 502 can be launched independently of and separately from the interaction client 504, such as by selecting an icon corresponding to the application 506 on a home screen of the computing system 502. Small-scale versions of such applications can be launched or accessed via the interaction client 504 and, in some examples, no or limited portions of the small-scale application can be accessed outside of the interaction client 504. The small-scale application can be launched by the interaction client 504 receiving, from a third-party server 512 for example, a markup-language document associated with the small-scale application and processing such a document.

In response to determining that the external resource is a locally-installed application 506, the interaction client 504 instructs the computing system 502 to launch the external resource by executing locally-stored code corresponding to the external resource. In response to determining that the external resource is a web-based resource, the interaction client 504 communicates with the third-party servers 512 (for example) to obtain a markup-language document corresponding to the selected external resource. The interaction client 504 then processes the obtained markup-language document to present the web-based external resource within a user interface of the interaction client 504.

The interaction client 504 can notify a user of the computing system 502, or other users related to such a user (e.g., "friends"), of activity taking place in one or more external resources. For example, the interaction client 504 can provide participants in a conversation (e.g., a chat session) in the interaction client 504 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective interaction clients 504, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 504. The external resource can selectively include different media items in the responses, based on a current context of the external resource.

The interaction client 504 can present a list of the available external resources (e.g., applications 506 or applets) to a user to launch or access a given external resource. This list can be presented in a context-sensitive menu. For example, the icons representing different ones of the application 506 (or applets) can vary based on how the menu is launched by the user (e.g., from a conversation interface or from a non-conversation interface).

Data Architecture

Figure 6:
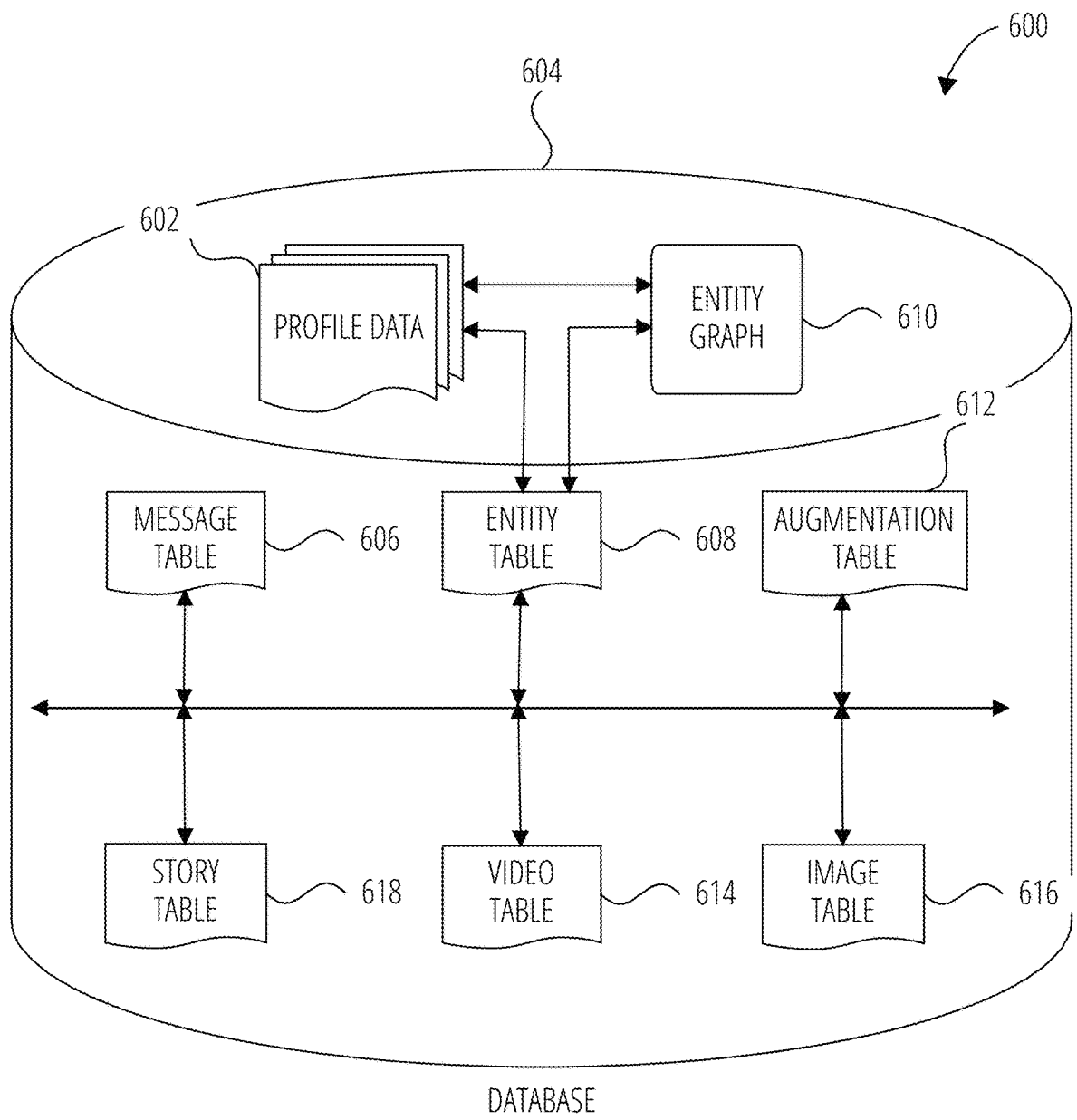
FIG. 6 is a diagrammatic representation of a data structure as maintained in a database, in accordance with some examples.

FIG. 6 is a schematic diagram illustrating data structures 600, which may be stored in the database 604 of the interaction server system 510, according to certain examples. While the content of the database 604 is shown to comprise multiple tables, it will be appreciated that the data could be stored in other types of data structures (e.g., as an object-oriented database).

The database 604 includes message data stored within a message table 606. This message data includes, for any particular message, at least message sender data, message recipient (or receiver) data, and a payload. Further details regarding information that may be included in a message, and included within the message data stored in the message table 606, are described below with reference to FIG. 6.

An entity table 608 stores entity data, and is linked (e.g., referentially) to an entity graph 610 and profile data 602. Entities for which records are maintained within the entity table 608 may include individuals, corporate entities, organizations, objects, places, events, and so forth. Regardless of entity type, any entity regarding which the interaction server system 510 stores data may be a recognized entity. Each entity is provided with a unique identifier, as well as an entity type identifier (not shown).

The entity graph 610 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 500.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 608. Such privacy settings may be applied to all types of relationships within the context of the interaction system 500, or may selectively be applied to only certain types of relationships.

The profile data 602 stores multiple types of profile data about a particular entity. The profile data 602 may be selectively used and presented to other users of the interaction system 500 based on privacy settings specified by a particular entity. Where the entity is an individual, the profile data 602 includes, for example, a username, telephone number, address, settings (e.g., notification and privacy settings), as well as a user-selected avatar representation (or collection of such avatar representations). A particular user may then selectively include one or more of these avatar representations within the content of messages communicated via the interaction system 500, and on map interfaces displayed by interaction clients 504 to other users. The collection of avatar representations may include "status avatars," which present a graphical representation of a status or activity that the user may select to communicate at a particular time.

Where the entity is a group, the profile data 602 for the group may similarly include one or more avatar representations associated with the group, in addition to the group name, members, and various settings (e.g., notifications) for the relevant group.

The database 604 also stores augmentation data, such as overlays or filters, in an augmentation table 612. The augmentation data is associated with and applied to videos (for which data is stored in a video table 614) and images (for which data is stored in an image table 616).

Filters, in some examples, are overlays that are displayed as overlaid on an image or video during presentation to a message receiver. Filters may be of various types, including user-selected filters from a set of filters presented to a message sender by the interaction client 504 when the message sender is composing a message. Other types of filters include geolocation filters (also known as geo-filters), which may be presented to a message sender based on geographic location. For example, geolocation filters specific to a neighborhood or special location may be presented within a user interface by the interaction client 504, based on geolocation information determined by a Global Positioning System (GPS) unit of the computing system 502.

Another type of filter is a data filter, which may be selectively presented to a message sender by the interaction client 504 based on other inputs or information gathered by the computing system 502 during the message creation process. Examples of data filters include current temperature at a specific location, a current speed at which a message sender is traveling, battery life for a computing system 502, or the current time.

Other augmentation data that may be stored within the image table 616 includes augmented reality content items (e.g., corresponding to applying Lenses or augmented reality experiences). An augmented reality content item may be a real-time special effect and sound that may be added to an image or a video.

As described above, augmentation data includes AR, VR, and mixed reality (MR) content items, overlays, image transformations, images, and modifications that may be applied to image data (e.g., videos or images). This includes real-time modifications, which modify an image as it is captured using device sensors (e.g., one or multiple cameras) of the computing system 502 and then displayed on a screen of the computing system 502 with the modifications. This also includes modifications to stored content, such as video clips in a collection or group that may be modified. For example, in a computing system 502 with access to multiple augmented reality content items, a user can use a single video clip with multiple augmented reality content items to see how the different augmented reality content items will modify the stored clip. Similarly, real-time video capture may use modifications to show how video images currently being captured by sensors of a computing system 502 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudo-random animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In some examples, tracking of points on an object may be used to place an image or texture (which may be two-dimensional or three-dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each element of the object. This mesh is used in the following stage of tracking the elements of the object in the video stream. In the process of tracking, the mesh for each element is aligned with a position of each element. Then, additional points are generated on the mesh.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing the color of areas; removing some part of areas from the frames of the video stream; including new objects into areas that are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image using a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, visual features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

A transformation system can capture an image or video stream on a client device (e.g., the computing system 502) and perform complex image manipulations locally on the computing system 502 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the computing system 502.

In some examples, a computer animation model to transform image data can be used by a system where a user may capture an image or video stream of the user (e.g., a selfie) using the computing system 502 having a neural network operating as part of an interaction client 504 operating on the computing system 502. The transformation system operating within the interaction client 504 determines the presence of a face within the image or video stream and provides modification icons associated with a computer animation model to transform image data, or the computer animation model can be present as associated with an interface described herein. The modification icons include changes that are the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the computing system 502 as soon as the image or video stream is captured and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browsing to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 618 stores data regarding collections of messages and associated image, video, or audio data, which are compiled into a collection (e.g., a story or a gallery). The creation of a particular collection may be initiated by a particular user (e.g., each user for which a record is maintained in the entity table 608). A user may create a "personal story" in the form of a collection of content that has been created and sent/broadcast by that user. To this end, the user interface of the interaction client 504 may include an icon that is user-selectable to enable a message sender to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 504, to contribute content to a particular live story. The live story may be identified to the user by the interaction client 504, based on his or her location. The end result is a "live story" told from a community perspective.

A further type of content collection is known as a "location story," which enables a user whose computing system 502 is located within a specific geographic location (e.g., on a college or university campus) to contribute to a particular collection. In some examples, a contribution to a location story may require a second degree of authentication to verify that the end-user belongs to a specific organization or other entity (e.g., is a student on the university campus).

As mentioned above, the video table 614 stores video data that, in some examples, is associated with messages for which records are maintained within the message table 606. Similarly, the image table 616 stores image data associated with messages for which message data is stored in the entity table 608. The entity table 608 may associate various augmentations from the augmentation table 612 with various images and videos stored in the image table 616 and the video table 614.

The databases 604 also includes social network information collected by the social network system 722.

System Architecture

Figure 7:
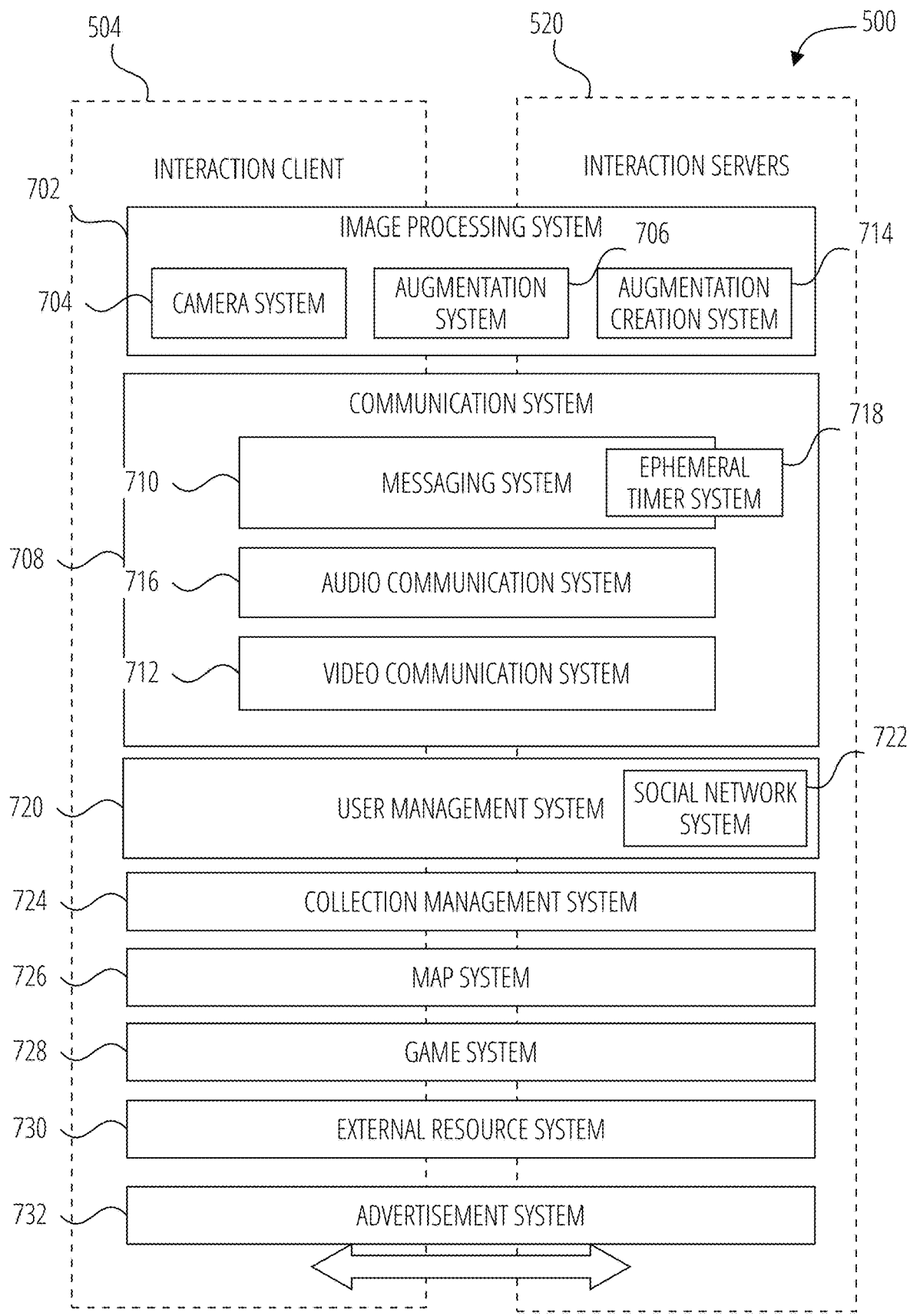
FIG. 7 is a diagrammatic representation of a messaging system that has both client-side and server-side functionality, in accordance with some examples.

FIG. 7 is a block diagram illustrating further details regarding the interaction system 500, according to some examples. Specifically, the interaction system 500 is shown to comprise the interaction client 504 and the Interaction servers 520. The interaction system 500 embodies multiple subsystems, which are supported on the client-side by the interaction client 504 and on the server-side by the Interaction servers 520. Example subsystems are discussed below.

An image processing system 702 provides various functions that enable a user to capture and augment (e.g., augment or otherwise modify or edit) media content associated with a message.

A camera system 704 includes control software (e.g., in a camera application) that interacts with and controls hardware camera hardware (e.g., directly or via operating system controls) of the computing system 502 to modify and augment real-time images captured and displayed via the interaction client 504.

The augmentation system 706 provides functions related to the generation and publishing of augmentations (e.g., media overlays) for images captured in real-time by cameras of the computing system 502 or retrieved from memory of the computing system 502. For example, the augmentation system 706 operatively selects, presents, and displays media overlays (e.g., an image filter or an image lens) to the interaction client 504 for the augmentation of real-time images received via the camera system 704 or stored images retrieved from memory 402 of a computing system 502. These augmentations are selected by the augmentation system 706 and presented to a user of an interaction client 504, based on a number of inputs and data, such as for example:

Geolocation of the computing system 502; and
Social network information of the user of the computing system 502.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at computing system 502 for communication in a message, or applied to video content, such as a video content stream or feed transmitted from an interaction client 504. As such, the image processing system 702 may interact with, and support, the various subsystems of the communication system 708, such as the messaging system 710 and the video communication system 712.

A media overlay may include text or image data that can be overlaid on top of a photograph taken by the computing system 502 or a video stream produced by the computing system 502. In some examples, the media overlay may be a location overlay (e.g., Venice beach), a name of a live event, or a name of a merchant overlay (e.g., Beach Coffee House). In further examples, the image processing system 702 uses the geolocation of the computing system 502 to identify a media overlay that includes the name of a merchant at the geolocation of the computing system 502. The media overlay may include other indicia associated with the merchant. The media overlays may be stored in the databases 524 and accessed through the database server 522.

The image processing system 702 provides a user-based publication platform that enables users to select a geolocation on a map and upload content associated with the selected geolocation. The user may also specify circumstances under which a particular media overlay should be offered to other users. The image processing system 702 generates a media overlay that includes the uploaded content and associates the uploaded content with the selected geolocation.

The augmentation creation system 714 supports augmented reality developer platforms and includes an application for content creators (e.g., artists and developers) to create and publish augmentations (e.g., augmented reality experiences) of the interaction client 504. The augmentation creation system 714 provides a library of built-in features and tools to content creators including, for example custom shaders, tracking technology, and templates.

In some examples, the augmentation creation system 714 provides a merchant-based publication platform that enables merchants to select a particular augmentation associated with a geolocation via a bidding process. For example, the augmentation creation system 714 associates a media overlay of the highest bidding merchant with a corresponding geolocation for a predefined amount of time.

A communication system 708 is responsible for enabling and processing multiple forms of communication and interaction within the interaction system 500 and includes a messaging system 710, an audio communication system 716, and a video communication system 712. The messaging system 710 is responsible for enforcing the temporary or time-limited access to content by the interaction clients 504. The messaging system 710 incorporates multiple timers (e.g., within an ephemeral timer system 718) that, based on duration and display parameters associated with a message or collection of messages (e.g., a story), selectively enable access (e.g., for presentation and display) to messages and associated content via the interaction client 504. Further details regarding the operation of the ephemeral timer system 718 are provided below. The audio communication system 716 enables and supports audio communications (e.g., real-time audio chat) between multiple interaction clients 504. Similarly, the video communication system 712 enables and supports video communications (e.g., real-time video chat) between multiple interaction clients 504.

A user management system 720 is operationally responsible for the management of user data and profiles, and includes a social network system 722 that maintains social network information regarding relationships between users of the interaction system 500.

A collection management system 724 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 724 may also be responsible for publishing an icon that provides notification of a particular collection to the user interface of the interaction client 504. The collection management system 724 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 724 employs machine vision (or image recognition technology) and content rules to curate a content collection automatically. In certain examples, compensation may be paid to a user to include user-generated content into a collection. In such cases, the collection management system 724 operates to automatically make payments to such users to use their content.

A map system 726 provides various geographic location functions and supports the presentation of map-based media content and messages by the interaction client 504. For example, the map system 726 enables the display of user icons or avatars (e.g., stored in profile data 602) on a map to indicate a current or past location of "friends" of a user, as well as media content (e.g., collections of messages including photographs and videos) generated by such friends, within the context of a map. For example, a message posted by a user to the interaction system 500 from a specific geographic location may be displayed within the context of a map at that particular location to "friends" of a specific user on a map interface of the interaction client 504. A user can furthermore share his or her location and status information (e.g., using an appropriate status avatar) with other users of the interaction system 500 via the interaction client 504, with this location and status information being similarly displayed within the context of a map interface of the interaction client 504 to selected users.

A game system 728 provides various gaming functions within the context of the interaction client 504. The interaction client 504 provides a game interface providing a list of available games that can be launched by a user within the context of the interaction client 504 and played with other users of the interaction system 500. The interaction system 500 further enables a particular user to invite other users to participate in the play of a specific game by issuing invitations to such other users from the interaction client 504. The interaction client 504 also supports audio, video, and text messaging (e.g., chats) within the context of gameplay, provides a leaderboard for the games, and also supports the provision of in-game rewards (e.g., coins and items).

An external resource system 730 provides an interface for the interaction client 504 to communicate with remote servers (e.g., third-party servers 512) to launch or access external resources, i.e., applications or applets. Each third-party server 512 hosts, for example, a markup language (e.g., HTML5) based application or a small-scale version of an application (e.g., game, utility, payment, or ride-sharing application). The interaction client 504 may launch a web-based resource (e.g., application) by accessing the HTML5 file from the third-party servers 512 associated with the web-based resource. Applications hosted by third-party servers 512 are programmed in JavaScript leveraging a Software Development Kit (SDK) provided by the Interaction servers 520. The SDK includes Application Programming Interfaces (APIs) with functions that can be called or invoked by the web-based application. The Interaction servers 520 host a JavaScript library that provides a given external resource access to specific user data of the interaction client 504. HTML5 is an example of technology for programming games, but applications and resources programmed based on other technologies can be used.

To integrate the functions of the SDK into the web-based resource, the SDK is downloaded by the third-party server 512 from the Interaction servers 520 or is otherwise received by the third-party server 512. Once downloaded or received, the SDK is included as part of the application code of a web-based external resource. The code of the web-based resource can then call or invoke certain functions of the SDK to integrate features of the interaction client 504 into the web-based resource.

The SDK stored on the interaction server system 510 effectively provides the bridge between an external resource (e.g., applications 506 or applets) and the interaction client 504. This gives the user a seamless experience of communicating with other users on the interaction client 504 while also preserving the look and feel of the interaction client 504. To bridge communications between an external resource and an interaction client 504, the SDK facilitates communication between third-party servers 512 and the interaction client 504. A WebViewJavaScriptBridge running on a computing system 502 establishes two one-way communication channels between an external resource and the interaction client 504. Messages are sent between the external resource and the interaction client 504 via these communication channels asynchronously. Each SDK function invocation is sent as a message and callback. Each SDK function is implemented by constructing a unique callback identifier and sending a message with that callback identifier.

By using the SDK, not all information from the interaction client 504 is shared with third-party servers 512. The SDK limits which information is shared based on the needs of the external resource. Each third-party server 512 provides an HTML5 file corresponding to the web-based external resource to Interaction servers 520. The Interaction servers 520 can add a visual representation (such as a box art or other graphic) of the web-based external resource in the interaction client 504. Once the user selects the visual representation or instructs the interaction client 504 through a GUI of the interaction client 504 to access features of the web-based external resource, the interaction client 504 obtains the HTML5 file and instantiates the resources to access the features of the web-based external resource.

The interaction client 504 presents a graphical user interface (e.g., a landing page or title screen) for an external resource. During, before, or after presenting the landing page or title screen, the interaction client 504 determines whether the launched external resource has been previously authorized to access user data of the interaction client 504. In response to determining that the launched external resource has been previously authorized to access user data of the interaction client 504, the interaction client 504 presents another graphical user interface of the external resource that includes functions and features of the external resource. In response to determining that the launched external resource has not been previously authorized to access user data of the interaction client 504, after a threshold period of time (e.g., 3 seconds) of displaying the landing page or title screen of the external resource, the interaction client 504 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 504 adds the external resource to a list of authorized external resources and allows the external resource to access user data from the interaction client 504. The external resource is authorized by the interaction client 504 to access the user data under an OAuth 2 framework.

The interaction client 504 controls the type of user data that is shared with external resources based on the type of external resource being authorized. For example, external resources that include full-scale applications (e.g., an application 506) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 732 operationally enables the purchasing of advertisements by third parties for presentation to end-users via the interaction clients 504 and also handles the delivery and presentation of these advertisements.

Software Architecture

Figure 8:
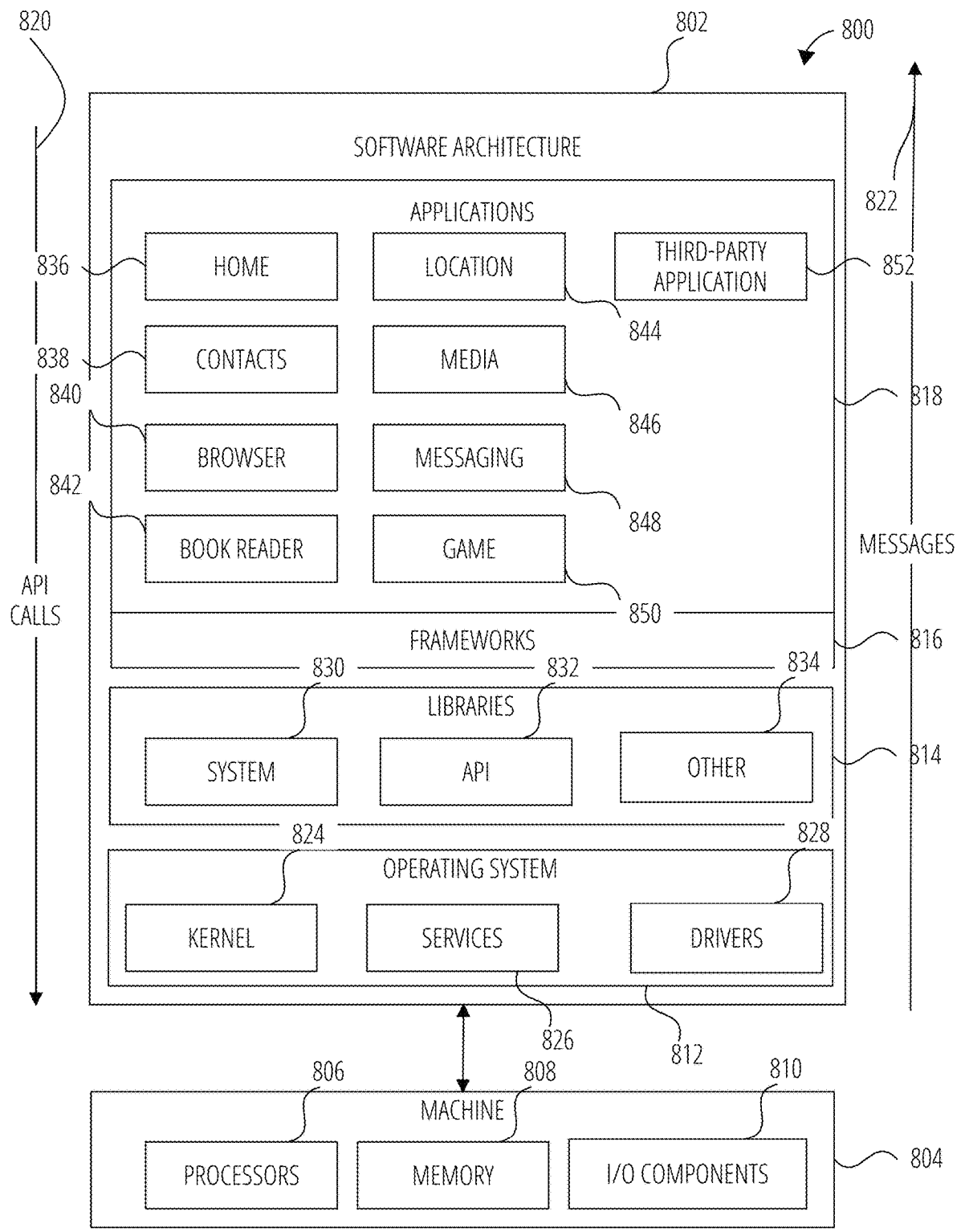
FIG. 8 is a block diagram showing a software architecture, in accordance with some examples.

FIG. 8 is a block diagram 800 illustrating a software architecture 802, which can be installed on any one or more of the devices described herein. The software architecture 802 is supported by hardware such as a machine 804 that includes processors 806, memory 808, and I/O components 810. In this example, the software architecture 802 can be conceptualized as a stack of layers, where each layer provides a particular functionality. The software architecture 802 includes layers such as an operating system 812, libraries 814, frameworks 816, and applications 818. Operationally, the applications 818 invoke API calls 820 through the software stack and receive messages 822 in response to the API calls 820.

The operating system 812 manages hardware resources and provides common services. The operating system 812 includes, for example, a kernel 824, services 826, and drivers 828. The kernel 824 acts as an abstraction layer between the hardware and the other software layers. For example, the kernel 824 provides memory management, processor management (e.g., scheduling), component management, networking, and security settings, among other functionalities. The services 826 can provide other common services for the other software layers. The drivers 828 are responsible for controlling or interfacing with the underlying hardware. For instance, the drivers 828 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 814 provide a common low-level infrastructure used by the applications 818. The libraries 814 can include system libraries 830 (e.g., C standard library) that provide functions such as memory allocation functions, string manipulation functions, mathematic functions, and the like. In addition, the libraries 814 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 814 can also include a wide variety of other libraries 834 to provide many other APIs to the applications 818.

The frameworks 816 provide a common high-level infrastructure that is used by the applications 818. For example, the frameworks 816 provide various graphical user interface (GUI) functions, high-level resource management, and high-level location services. The frameworks 816 can provide a broad spectrum of other APIs that can be used by the applications 818, some of which may be specific to a particular operating system or platform.

In an example, the applications 818 may include a home application 836, a contacts application 838, a browser application 840, a book reader application 842, a location application 844, a media application 846, a messaging application 848, a game application 850, and a broad assortment of other applications such as a third-party application 852. The applications 818 are programs that execute functions defined in the programs. Various programming languages can be employed to create one or more of the applications 818, structured in a variety of manners, such as object-oriented programming languages (e.g., Objective-C, Java, or C++) or procedural programming languages (e.g., C or assembly language). In a specific example, the third-party application 852 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 852 can invoke the API calls 820 provided by the operating system 812 to facilitate functionalities described herein.

CONCLUSION

Changes and modifications may be made to the disclosed examples without departing from the scope of the present disclosure. These and other changes or modifications are intended to be included within the scope of the present disclosure, as expressed in the following claims.

Glossary

"Carrier signal" refers to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Machine-readable storage medium" refers to both machine-storage media and transmission media. Thus, the terms include both storage devices/media and carrier waves/modulated data signals. The terms "computer-readable medium," "machine-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory machine-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A machine comprising:
one or more processors; and
a memory storing instructions that, when executed by the one or more processors, cause the machine to perform operations comprising:
providing to a user an extended Reality (XR) user interface of an XR system, the XR user interface comprising a virtual object displayed to the user;
determining a pinch location of a pinch hand pose being made by the user using one hand of the user;
scaling the virtual object based on the pinch hand pose of the one hand using the pinch location and a virtual object center point of the virtual object by performing operations comprising:
generating a virtual object vector based on a center point of the virtual object and the pinch location;
generating a pinch vector based on the center point of the virtual object and a virtual object pinch collider of the virtual object;
determining a scaling vector based on a projection of the pinch vector onto the virtual object vector; and
adjusting the scale of the virtual object based on a ratio of a length of the scaling vector and a length of the virtual object vector; and
redisplaying the scaled virtual object to the user in the XR user interface.

2. The machine of claim 1, wherein determining a pinch location comprises:
capturing using one or more cameras of the XR system, tracking video frame data;
determining hand-tracking data based on the tracking video frame data; and
determining the pinch location based on the hand-tracking data.

3. The machine of claim 2, wherein determining the pinch location based on the hand-tracking data comprises:
determining a pinch location collider based on skeletal model data of the hand-tracking data; and
determining the pinch location based on the pinch location collider.

4. The machine of claim 1, wherein the operations further comprise:
detecting that the pinch hand pose is still being held by the user after redisplaying the scaled object; and
in response to detecting that the pinch hand pose is still being held, continuing to scale the virtual object based on the scaling vector.

5. The machine of claim 1, wherein the XR system comprises a head-wearable apparatus.

6. The machine of claim 1, wherein determining the pinch location comprises:
detecting an intersection between a pinch location collider and a virtual object pinch collider; and
determining three-dimensional coordinates of the pinch location based on the detected intersection between the pinch location collider and the virtual object pinch collider.

7. The machine of claim 1, wherein determining that the pinch hand pose is no longer being held comprises:
detecting a sequence of proto hand poses as the user moves a fingertip of a forefinger away from a fingertip of a thumb of the one hand making the pinch hand pose; and
determining the pinch hand pose is released based on the detected sequence of proto hand poses.

8. A computer-implemented method comprising:
providing, by one or more processors, to a user an XR user interface of an XR system, the XR user interface comprising a virtual object displayed to the user;
determining, by the one or more processors, a pinch location of a pinch hand pose being made by the user using one hand of the user;
scaling, by the one or more processors, the virtual object based on the pinch hand pose of the one hand using the pinch location and a virtual object center point of the virtual object by performing operations comprising:
generating a virtual object vector based on a center point of the virtual object and the pinch location;
generating a pinch vector based on the center point of the virtual object and a virtual object pinch collider of the virtual object;
determining a scaling vector based on a projection of the pinch vector onto the virtual object vector; and
adjusting the scale of the virtual object based on a ratio of a length of the scaling vector and a length of the virtual object vector; and redisplaying, by the one or more processors, the scaled virtual object to the user in the XR user interface.

9. The computer-implemented method of claim 8, wherein determining a pinch location comprises:
capturing, by the one or more processors, using one or more cameras of the XR system, tracking video frame data;
determining, by the one or more processors, hand-tracking data based on the tracking video frame data; and
determining, by the one or more processors, the pinch location based on the hand-tracking data.

10. The computer-implemented method of claim 9, wherein determining the pinch location based on the hand-tracking data comprises:
determining, by the one or more processors, a pinch location collider based on skeletal model data of the hand-tracking data; and
determining, by the one or more processors, the pinch location based on the pinch location collider.

11. The computer-implemented method of claim 8, further comprising:
detecting, by the one or more processors, that the pinch hand pose is still being held by the user after redisplaying the scaled virtual object; and
in response to detecting that the pinch hand pose is still being held, continuing, by the one or more processors, to scale the virtual object based on the scaling vector.

12. The computer-implemented method of claim 8, wherein the XR system comprises a head-wearable apparatus.

13. The computer-implemented method of claim 8, wherein determining the pinch location comprises:
detecting an intersection between a pinch location collider and a virtual object pinch collider; and
determining three-dimensional coordinates of the pinch location based on the detected intersection between the pinch location collider and the virtual object pinch collider.

14. The computer-implemented method of claim 8, wherein determining that the pinch hand pose is no longer being held comprises:
detecting a sequence of proto hand poses as the user moves a fingertip of a forefinger away from a fingertip of a thumb of the one hand making the pinch hand pose; and
determining the pinch hand pose is released based on the detected sequence of proto hand poses.

15. A non-transitory machine-readable storage medium, the machine-readable storage medium including instructions that, when executed by a machine, cause the machine to perform operations comprising:
providing, to a user, an XR user interface of an XR system, the XR user interface comprising a virtual object displayed to the user;
determining a pinch location of a pinch hand pose being made by the user using one hand of the user;
scaling the virtual object based on the pinch hand pose of the one hand using the pinch location and a virtual object center point of the virtual object by performing operations comprising:
generating a virtual object vector based on a center point of the virtual object and the pinch location;
generating a pinch vector based on the center point of the virtual object and a virtual object pinch collider of the virtual object;
determining a scaling vector based on a projection of the pinch vector onto the virtual object vector; and
adjusting the scale of the virtual object based on a ratio of a length of the scaling vector and a length of the virtual object vector; and
redisplaying the scaled virtual object to the user in the XR user interface.

16. The non-transitory machine-readable storage medium of claim 15, wherein determining a pinch location comprises:
capturing, using one or more cameras of the XR system, tracking video frame data;
determining hand-tracking data based on the tracking video frame data; and
determining the pinch location based on the hand-tracking data.

17. The non-transitory machine-readable storage medium of claim 16, wherein determining the pinch location based on the hand-tracking data comprises:
determining a pinch location collider based on skeletal model data of the hand-tracking data; and
determining the pinch location based on the pinch location collider.

18. The non-transitory machine-readable storage medium of claim 15, wherein the XR system comprises a head-wearable apparatus.

19. The non-transitory machine-readable storage medium of claim 15, wherein determining the pinch location comprises:
detecting an intersection between a pinch location collider and a virtual object pinch collider; and
determining three-dimensional coordinates of the pinch location based on the detected intersection between the pinch location collider and the virtual object pinch collider.

20. The non-transitory machine-readable storage medium of claim 15, wherein determining that the pinch hand pose is no longer being held comprises:
detecting a sequence of proto hand poses as the user moves a fingertip of a forefinger away from a fingertip of a thumb of the one hand making the pinch hand pose; and
determining the pinch hand pose is released based on the detected sequence of proto hand poses.

* * * * *